United States Patent [19]

Sexton

[11] 4,242,735
[45] Dec. 30, 1980

[54] CALCULATOR-PRINTER INTERFACE WITH NUMERICAL STRING SEGMENTATION

[75] Inventor: Joe F. Sexton, Houston, Tex.

[73] Assignee: Texas Instruments Incorporated, Dallas, Tex.

[21] Appl. No.: 962,420

[22] Filed: Nov. 20, 1978

Related U.S. Application Data

[63] Continuation of Ser. No. 680,834, Apr. 28, 1976, abandoned, which is a continuation of Ser. No. 429,336, Dec. 28, 1973, abandoned.

[51] Int. Cl.³ ............................................. G06F 3/12
[52] U.S. Cl. .................................................... 364/900
[58] Field of Search ... 364/900 MS File, 200 MS File

[56] References Cited

U.S. PATENT DOCUMENTS

| | | | |
|---|---|---|---|
| 3,103,580 | 9/1963 | Foreman | 364/900 |
| 3,286,237 | 11/1966 | Kikuchi | 364/900 |
| 3,430,211 | 2/1969 | Foure et al. | 364/900 |
| 3,439,341 | 4/1969 | Dolby | 364/900 |
| 3,638,197 | 1/1972 | Brennan, Jr. | 364/900 |
| 3,656,427 | 4/1972 | Foley | 101/93.29 |
| 3,662,346 | 5/1972 | Tada | 364/900 |
| 3,716,841 | 2/1973 | Jones | 364/900 |
| 3,984,816 | 10/1976 | Cochran et al. | 364/900 |

OTHER PUBLICATIONS

New Scientist-London, England-Hewlett Packard (HP91) Calculator-pp. 240–241, 4/29/76.

*Primary Examiner*—Harvey E. Springborn
*Attorney, Agent, or Firm*—Robert D. Marshall, Jr.; Stephen S. Sadacca; Melvin Sharp

[57] ABSTRACT

A calculator printer interface performs control of a printer's segmenting of symbols in a string of numeral words from an LSI/MOS calculator chip. The output from the LSI/MOS calculator chip is a sequence of multibit data words including a leading decimal point position word indicating the position of a decimal point followed by numeral words indicating respective numerals of a number to be printed. The decimal point position word is decoded and the numeral words are entered into a shift register together with a word indicating a decimal point in the position within the sequence indicated by the decimal point position word. When the number is printed, words indicating where commas are to appear are inserted into the sequence of data words outputted from the shift register by counting by three after the word indicating a decimal. Commas and zeros occurring after the last nonzero numeral word in the sequence are suppressed.

9 Claims, 22 Drawing Figures

| Fig. 4b | Fig. 4e | Fig. 4h | Fig. 4k | Fig. 4n |
| --- | --- | --- | --- | --- |
| Fig. 4c | Fig. 4f | Fig. 4i | Fig. 4L | Fig. 4o |
| | | | | Fig. 4p |
| Fig. 4d | Fig. 4g | Fig. 4j | Fig. 4m | Fig. 4q |
FIG. 4a
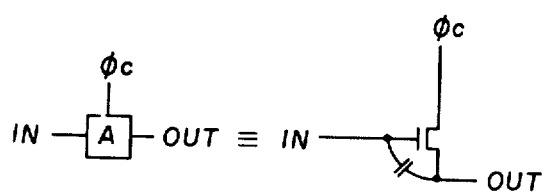
FIG. 4r
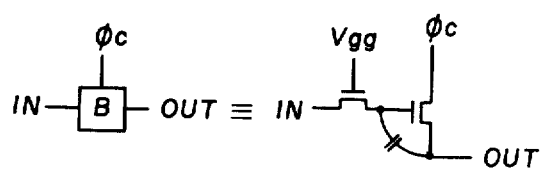
FIG. 4s

121
DATA REGISTER

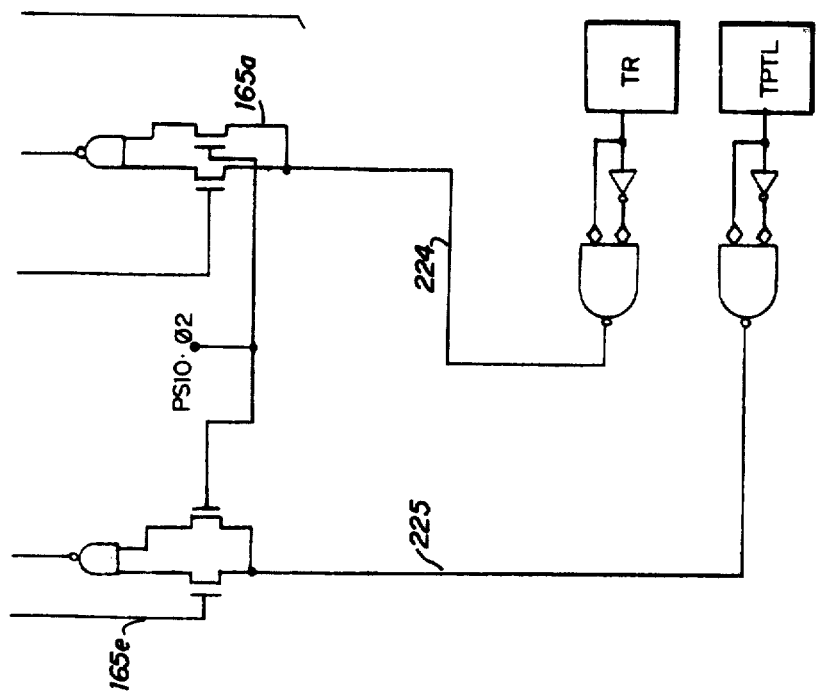
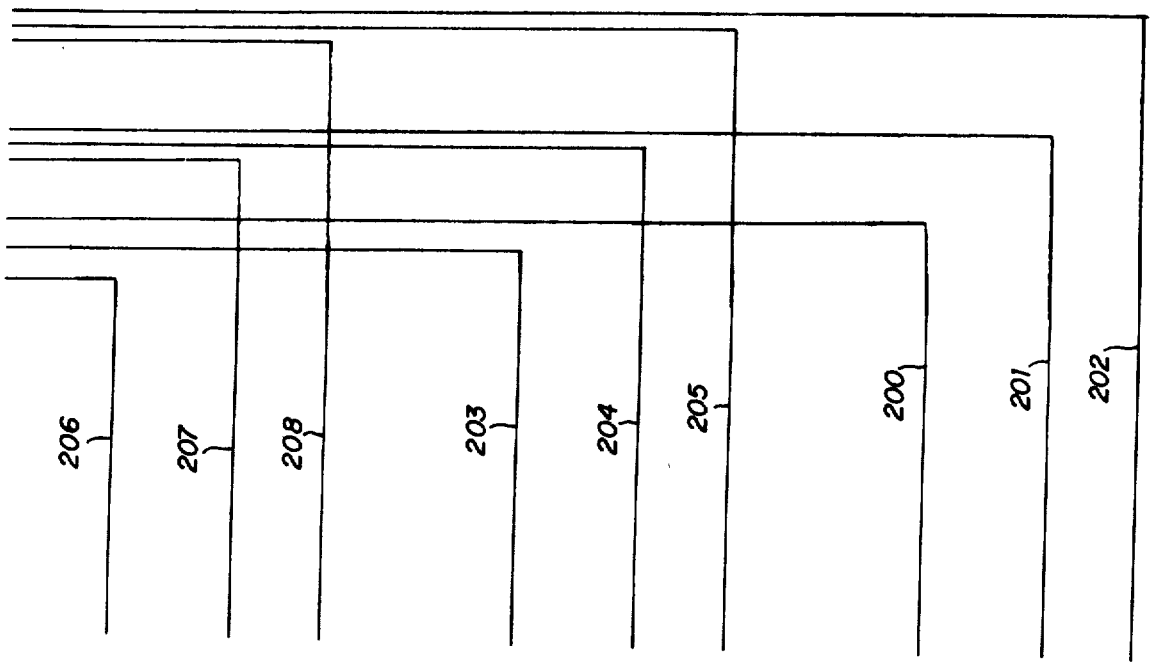
FIG. 4q

# CALCULATOR-PRINTER INTERFACE WITH NUMERICAL STRING SEGMENTATION This application is a continuation of application Ser. No. 680,834, filed Apr. 28, 1976, now abandoned, which was a continuation of Ser. No. 429,336, filed Dec. 28, 1973, also now abandoned.

This invention relates to the control of a drum printer, and in a more specific aspect to an MOS/LST chip which receives data, timing signals and synchronizing signals from a calculator and synchronizing signals from a drum printer for selective control of insertion of a decimal point and of commas in printing a string of numbers on a given line.

Drum printers are available in various specific configurations. In general, such printers involve a rotating drum having rows of numerals and symbols defining a like plurality of multi-symbol rings encircling the drum. The drum rotates at a relatively low speed such as five revolutions per second. Hammers adjacent to the periphery of the drum are adapted to be actuated to strike the surface of the drum. One hammer is provided for each ring of symbols. The hammers strike the surface of the drum with a sharp blow without stopping the drum to impress on a paper positioned between the hammer and drum the image of the symbol facing the paper at the instant the hammer is energized. A typical commercially available drum printer is of the type manufactured and sold by Seiko Instruments, Inc., 16 E. 52nd St., New York, N.Y., 10022 under the trade name "Seiko". Fifteen multi-symbol rings print fifteen columns of data and three additional well-symbol rings located adjacent to the ring for the most significant digit to print three columns of function symbols.

The present invention is directed to a system for the control of the printing of decimals and commas by a drum printer of this general class where a semiconductor chip contains integrated circuitry for timing and controlling printing a complete line of desired symbols during one drum rotation.

More particularly, in accordance with the present invention a multibit, multiword shift register stores a set of multibit data words representing a set of symbols to be printed. A counter responds to a drum output signal to count drum symbol positions passing a print station. A comparator is connected to the shift register and to the counter and has an output gated into an output buffer register the capacity of which corresponds with the number of rings on the drum. A timing means is connected to the shift register and to the output gate leading to the output buffer to circulate the data words in the register at a high rate compared with the rate of rotation of the drum and to clock a control state into the output register in response to coincidence between the output of said counter and of the shift register. Means are provided for loading a decimal code related to coding in the comparator for actuating the hammers in response to the control states and in response to a print command to insert a decimal point and necessary commas into the string of printed characters.

In a preferred embodiment of the invention, the shift register is loaded in a unique way to insert a decimal code and to initiate a count of digits ahead of the decimal point for insertion of commas in a line of printed characters.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 1

Figure 1:
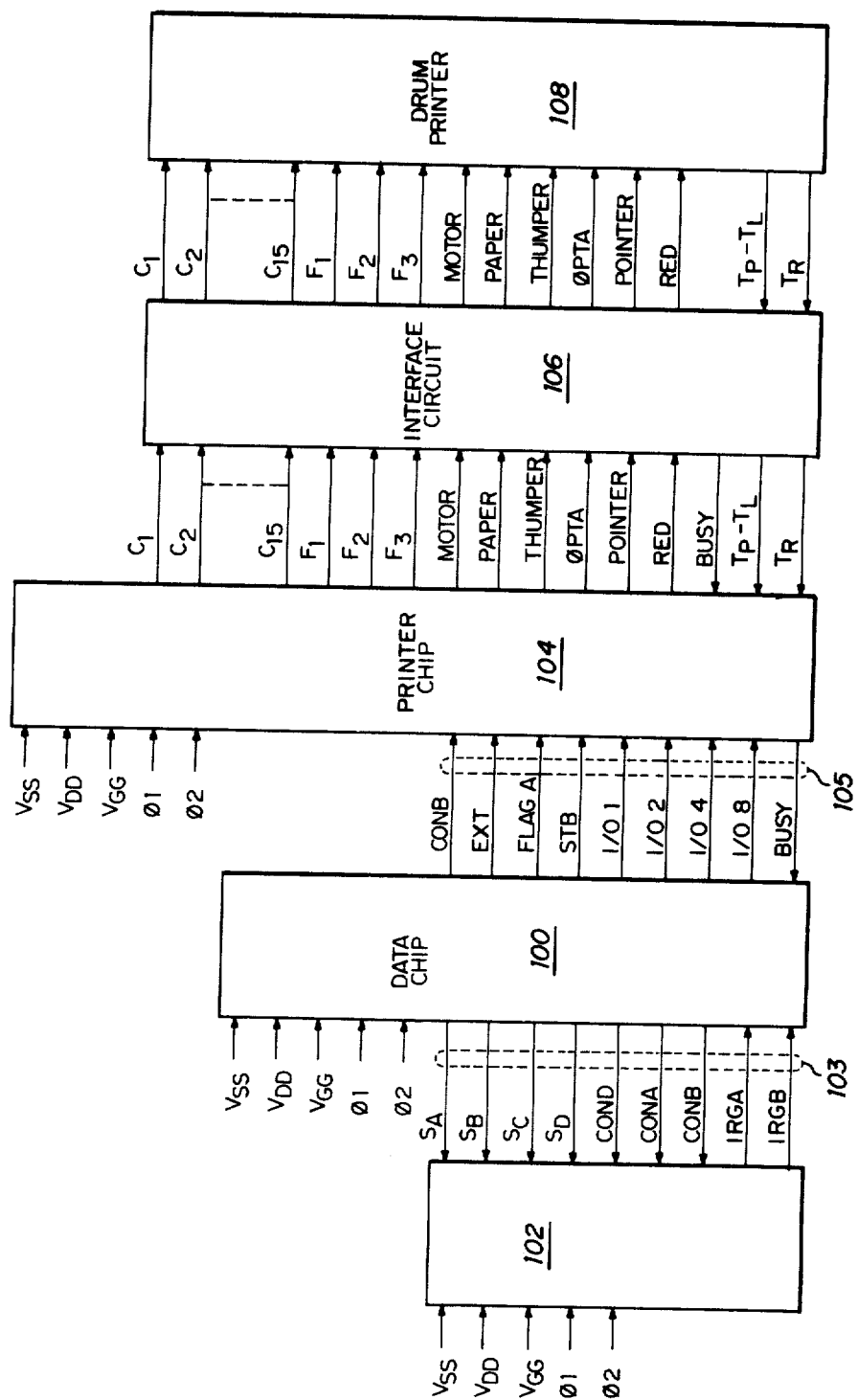
FIG. 1 is a block diagram of one embodiment of the present invention wherein a printer such as the Seiko printer cited above is to be controlled in response to the output of a calculator such as the SR50 manufactured and sold by Texas Instruments Incorporated.

In FIG. 1 three semiconductor integrated circuit chips are illustrated. Chips 100 and 102 comprise the principal elements of a two-chip calculator chip set manufactured and used in a calculator sold by Texas Instruments Incorporated and identified as the 4000 Calculator. It involves two chips of the TMS 0200 and TMS 0300 Series interconnected as described in detail in U.S. Pat. No. 3,984,816 issued Oct. 5, 1976, which is hereby incorporated by reference Chips 100 and 102 are LSI/MOS chips.

U.S. Pat. No. 3,984,816 describes an expandable calculator system and specifically provides for the addition of a printer chip to enable a calculator print out as here implemented with the chip 104. The data, function and timing signals generated in chips 100 and 102, and control chip 104 are in general as described in U.S. Pat. No. 3,984,816.

Chips 100 and 102 are interconnected by voltage, signal and control lines 103. Chip 100 is connected to printer chip 104 by lines 105. Chip 104 is also connected by way of an interface circuit 106 to a drum printer 108, such as the above identified commerical printer. Printer 108 in the embodiment herein described is an eighteen column printer.

Chip 104, chip 102 and interface circuit 106 communicate by way of connector pins. Table I indicates the pin, the pin name, the origin of the signal, its destination and on what clock the signal should be clocked into printer chip 104.

TABLE I

| PIN NAME | TYPE | ORIGIN/ DESTINATION DESCRIPTION |
|---|---|---|
| 1 $V_{SS}$ | VOLTAGE | PWR SUPPLY |
| 2 $V_{DD}$ | VOLTAGE | PWR SUPPLY |
| 3 $V_{GG}$ | VOLTAGE | PWR SUPPLY |
| 4 $\phi_1$ | CLOCK | CLOCK |

TABLE I-continued

| PIN | NAME | TYPE | ORIGIN/ DESTINATION | DESCRIPTION |
|---|---|---|---|---|
| 5 | $\phi_2$ | CLOCK | CLOCK | |
| 6 | CONB | INPUT | 0200 | Indicates idle mode; also used to sync data counter |
| 7 | FLAG | INPUT | 0200 | Flag A data |
| 8 | STROBE | INPUT | 0200 | Digit scan generation |
| 9 | TP-TL | INPUT | PRINTER | Drum timing pulses (row) |
| 10 | TR | INPUT | PRINTER | Drum reset pulse |
| 11 | BUSY | OUTPUT | 0200 | Tells data chip printer is busy |
| 12 | I/01 | INPUT | 0200 | |
| 13 | I/02 | INPUT | 0200 | 16-digit BCD output data |
| 14 | I/04 | INPUT | 0200 | |
| 15 | I/08 | INPUT | 0200 | |
| 16 | EXT | INPUT | 0200 | 7-bit function data |
| 17 | OPT A | INPUT | PRINTER | Controls type of drum motor operation |
| 18 | MOTOR DR | OUTPUT | PRINTER | Motor on-off control |
| 19 | RED RIB | OUTPUT | PRINTER | Indicates negative number |
| 20 | POINTER | OUTPUT | PRINTER | Indicates digit has been entered |
| 21 | PAPER ADV | OUTPUT | PRINTER | Advances paper and ribbon |
| 22 | THUMPER | OUTPUT | PRINTER | Indicates key has been entered |
| 23 | C1 | OUTPUT | PRINTER | |
| 24 | C2 | OUTPUT | PRINTER | |
| . . | | . | . | Hammer driving outputs to data columns |
| . . | | | | |
| . . | | | | |
| 37 | C15 | OUTPUT | PRINTER | |
| 38 | F1 | OUTPUT | PRINTER | |
| 39 | F2 | OUTPUT | PRINTER | Hammer driving outputs to function columns |
| 40 | F3 | OUTPUT | PRINTER | |

PIN DEFINITION

The following is a pin-by-pin functional description of the printer chip set out in Table I.

$V_{SS}$, $V_{DD}$, $V_{GG}$, $\phi_1$, $\phi_2$ are the same as in the two-chip system of U.S. Pat. No. 3,984,816.

CONB is a signal that is used to eliminate erroneous flag data. It is generated on the data chip of U.S. Pat. No. 3,984,816 and goes to a logical zero when chip 100 is idle.

FLAG is A group of the flags and is the printer chip 104, input through which the data chip 100 specifies control commands to the printer. During calculation, the flag data is in time with the states, but during idle, when CONB is a logical zero, the flag data is in time with the digits. Thus, FLAG is gated with CONB to obtain proper control of the printer.

STROBE is a signal used to generate the "D" times in the printer chip 104. It originates in the data chip 100 and is set for one state time each instruction cycle.

TP-TL are timing signals from the drum printer 108 that define the beginning and end of each character position around the drum. These signals are wired-ORed together to form one input to the printer chip.

TR is a reset signal input from the drum printer 108 and occurs once every drum revolution.

BUSY is an open-drain output to the data chip, which when set notifies the data chip 100 that the printer chip 104 is active and cannot accept new data.

I/01, I/02, I/04, I/08 are the inputs through which the data to be printed enters the printer chip.

EXT is the port through which a 7-bit serial-function code enters the printer chip 104. This code completely describes the position (row and column) of the function symbols to be printed.

OPTA is a printer chip input that controls the drum motor mode of operation. A $V_{SS}$ level results in the MOTOR DRIVE output being continuously on. A $V_{DD}$ level results in the MOTOR DRIVE output being in a user controlled state. In the latter state, the MOTOR DRIVE output is programmed to turn off after a predetermined idle period and to turn on again when an EXECUTE PRINT (and/or THUMPER) command is received.

Each of the next six pins are open drain outputs that drive external electromechanical devices, which perform the function indicated by their names: MOTOR DRIVE, RED RIBBON, POINTER, PAPER ADVANCE and THUMPER. Each output is set for a length of time controlled by the printer chip 104.

The next eighteen pins are all hammer driving outputs and are low resistance, open drive devices. The first fifteen (C1, C2 . . . C15) are used for the data columns; the last three (F1, F2, F3) for the function columns.

INTERNAL TIMING

The timing of the printer chip 104 is synchronized to the data chip 100 timing by the CONB input. A CONB instruction is executed at least once after power-up to assure this synchronization.

INPUTS

All input buffers on the printer chip are TTL compatible.

PRINTING FEATURES

Of the eighteen hammer driving outputs on the printer chip 104, fifteen are available for printing columns of data (decimal point, minus sign and numerals) and three are available for printing columns of function symbols. Typically, the print format is: 13 numerals, plus one floating minus signa, plus one decimal point, plus 3 symbols. When red ribbon is used, 14 numerals may be printed.

The floating minus sign is printed to the left of the most significant nonzero digit (or decimal point).

The decimal point is printed in the central position of the character space.

Each comma is a right-side print instead of a center-position print.

Leading zeros are suppressed.

For positive fractions and for negative fractions being printed in red, a zero is inserted to the left of the decimal point; e.g., 0.12, 0.032.

If a minus sign is being used, then for negative fractions it is inserted to the left of the decimal point; e.g., −0.12, −0.32.

FUNCTION SELECTION

As described above, information about the functions to be printed enters the printer chip 104 serially through the EXT pin in a seven bit code (four bits for row and three bits for column). This code can be developed for a specific function, directly from its location in the keyboard matrix of the calculator of U.S. Pat. No. 3,984,816; i.e., its D-line and its K-line. The encoded D-time forms the first four bits, and the next three bits are encoded from the K-line. The latter three bits describe the F1, F2, F3 columns, respectively.

Because the first four bits are determined by the D-time, the function symbol is placed on the print drum row corresponding to the function key D-time on the keyboard.

Since there are only fifteen D's, there are blanks in the function columns when more than fifteen drum rows are available. If more than one symbol is to be printed on one line, then normally these function symbols must be physically located on the same row of the drum.

The assignment of drum rows versus keyboard locations for data other than functions, is arbitrary and is matched by a gate program in the printer chip 104.

The printer chip 104 provides one level of data buffering, which allows the data chip 104 to continue operation while a line is being printed. The printer chip 104 is compatible with SEIKO 102, SEIKO 104, and SEIKO Mark II. It is compatible with SEIKO 101 limited to eighteen columns as described above.

FIG. 2

Figure 2:
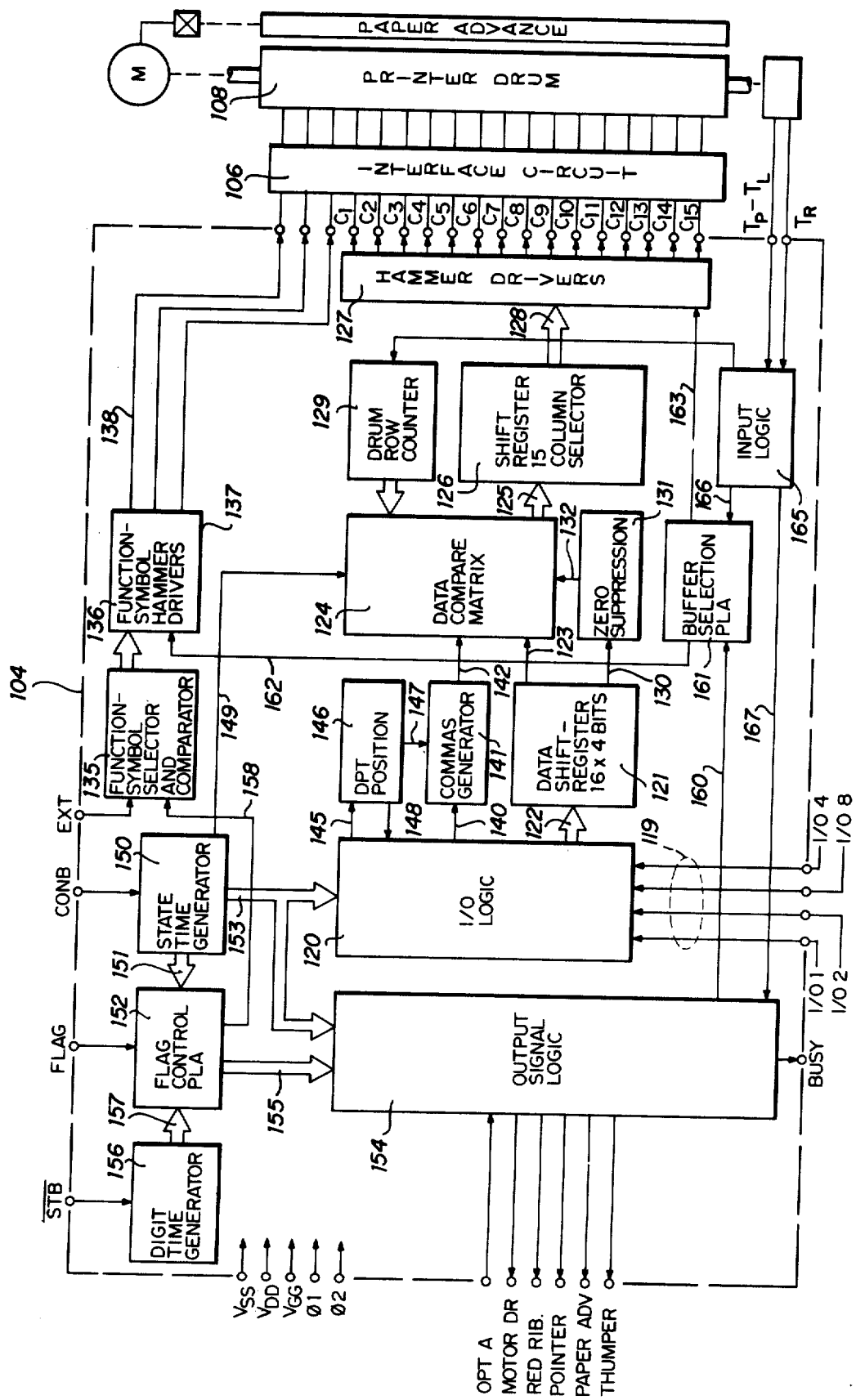
FIG. 2 is a more detailed block diagram of the printer chip 14 of FIG. 1.

In FIG. 2 chip 104 is shown in block form.

The four bit data input lines I/O1-I/O8 lead to an I/O logic unit 120, the output of which is applied to a data shift register 121. Shift register 121 is a 16×4 bit shift register. The shift register 121 has four sections, each of which comprises 16 stages or storage elements. The output from shift register 121 is connected by way of a four bit bus 123 to a data compare matrix 124, preferably a programmed logic array (PLA). The output line 125 leads from the matrix 124 to a shift register 126 which is a fifteen column selector for hammer drivers 127. Drivers 127 are connected to register 126 by way of bus 128. The output of the hammer drivers unit 127 is connected individually to output pins which in turn are connected through an interface circuit 106 to the hammer circuit of drum printer 108. A drum row counter 129 is connected to matrix 124.

The shift register 121 is connected by way of line 130 to a zero suppression unit 131 which is connected at its output by way of line 132 to matrix 124.

The seven bit function data enters by way of the EXT pin and is applied through a function-symbol selector and comparator 135 whose output is connected by way of a bus 136 to the function symbol hammer driver unit 137. The outputs of unit 137 are connected by way of lines 138 through interface unit 106 and thence to three hammers on drum printer 108.

The I/O logic unit 120 is also connected by way of line 140 to a commas generator unit 141, the output of which is connected by way of line 142 to matrix 124.

The I/O logic unit 120 is also connected by way of line 145 to the input of a decimal point position generator 146 whose output is connected by way of line 147 to the commas generator unit 141 and thence to the data compare matrix unit 124. It is also connected by way of line 148 to the I/O logic unit 120.

CONB pin is connected to the state time generator 150 whose output is connected by way of bus 151 to the flag control programmed logic array unit 152 to which the flag pin flag is connected. The output of the state time generator 150 is connected by way of line 149 to data compare matrix 124. Generator 150 is also connected by way of bus 153 to the I/O logic unit 120 and to an output signal logic unit 154. The output of flag control PLA unit 152 is connected by way of bus 155 to output signal logic unit 154. The $\overline{\text{STB}}$ pin is connected to a digit time generator unit 156 whose output is connected by way of a bus 157 to the flag control PLA 152. The output of flag control PLA is connected by way of a line 158 to the function-symbol selector and comparator 135. The output signal logic unit 154 is connected by way of line 160 to a buffer selection PLA unit 161. The output of the PLA 161 is connected by way of line 162 to the function-symbol hammer drivers unit 137 and by way of channel 163 to the hammer drivers unit 127.

Pins TR and TP-TL are connected to drum input logic unit 165 the output of which is connected by line 166 to buffer selection PLA 161 and, by way of line 167, to the output logic unit 154. The BUSY pin is connected from an output of logic unit 154 as are pins MOTOR DRIVE, RED RIBBON, POINTER, PAPER ADVANCE and THUMPER. The OPTA pin is connected as an input to output logic unit 154.

FIG. 3—TIMING

Figure 3:
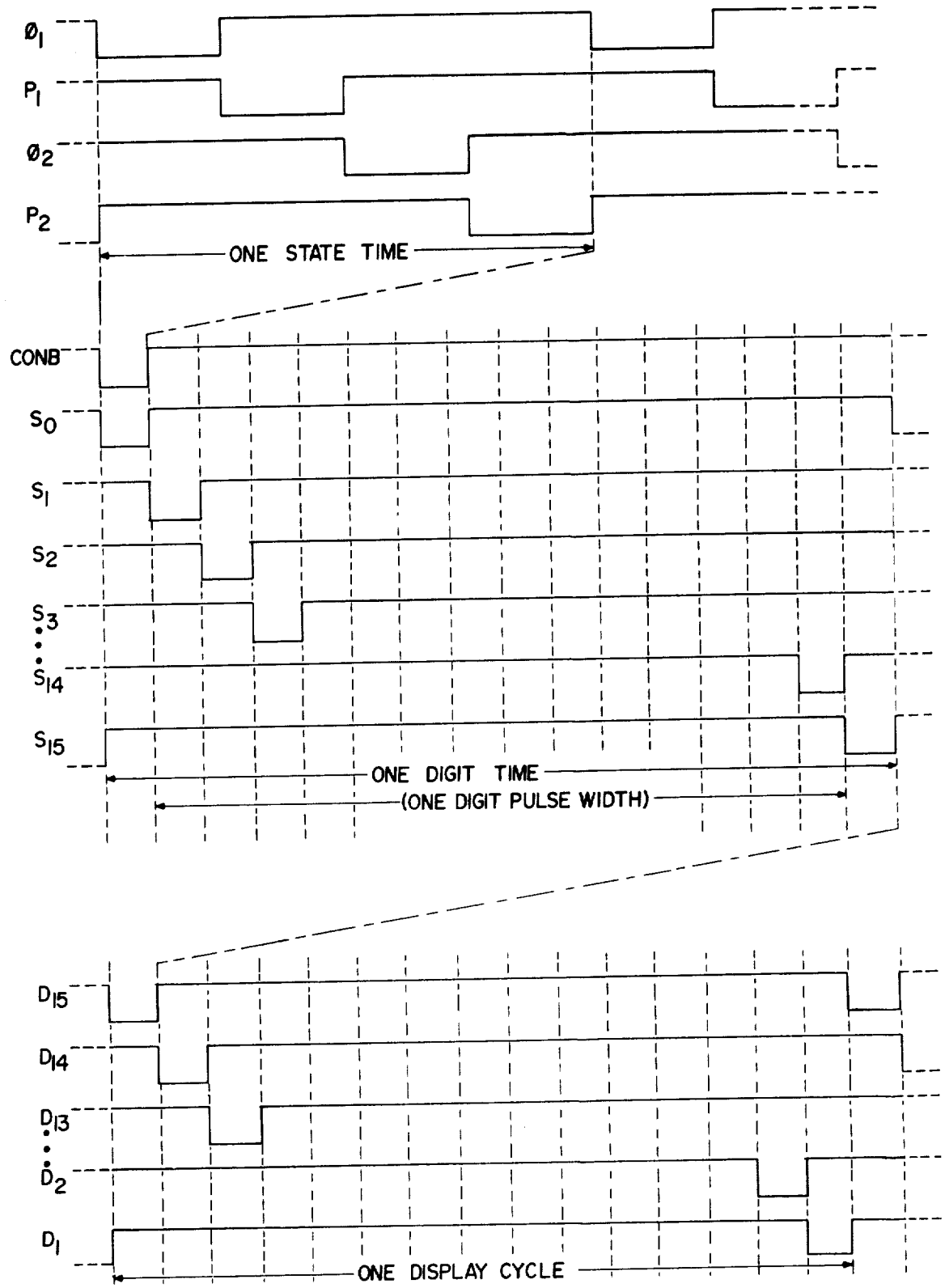
FIG. 3 is a plot of timing pulses employed on chip 14.

The entire printer chip operates on the two externally provided clocks signals $\phi_1$ and $\phi_2$ as seen in FIG. 3 and two internally generated clock signals $P_1$ and $P_2$. The frequency is of the order of 250 kHz for $\phi_1$ and $\phi_2$. The clock generators are conventional. They are not included on chip 104 but are supplied from the associated calculator.

A full set of clock symbols, $\phi_1$, $P_1$, $\phi_2$, $P_2$, is referred to as a state time. Sixteen state times in the data chip represent one D time or instruction cycle.

OPERATION—GENERAL

Printer chip 104 is responsive to synchronizing signals, data signals, and timing signals transmitted from the associated calculator.

Printer chip 104 can function only when CONB indicates that the calculator is idle. Clock signals $\phi_1$ and $\phi_2$, illustrated in FIG. 3, are continuously applied to the chip 104.

The associated calculator operates on the same timing basis and is synchronized with the chip 104 by the application of STB (strobe) pulse with one STB appearing each D time.

A print function is carried out during the calculator idle state. There are essentially two steps:

(1) The first step is to transmit to and store in chip 104 the function address, i.e., the address on the print wheel of the particular function to be printed out.
(2) The second step is to transmit to chip 104 the data that it is to be printed.

A print operation is initiated after the entry of numerical data followed by depression of a function key. More particularly, following depression of a function key, the calculator waits through $D_{12}$ time. Thereafter, during state 6 of $D_{11}$, a flag appears. The calculator resets the flag $A_6$ during its next D time, i.e., during $D_{12}$.

During time $D_{11}$, the address for the selected function, in the form of a seven-bit code, is applied through pin EXT and is thus available to the circuit leading to the function-symbol selector and comparator 135. The $A_6$ flag appearing during $D_{11}$ is detected in the flag control PLA 152 and in the digit time generator unit 156. Selector and comparator 135 is enabled by the output of the digit time flag generator 156 to store the address of the selected function in selector and comparator 135.

If it is desired to print a second function, a similar procedure is followed, i.e. flag $A_6$ is transmitted during $D_9$. The address for the second function is then stored in a second section of the selector and comparator 135.

If a third function is to be printed, a similar sequence is followed, i.e. flag $A_6$ is transmitted from the calculator during digit time $D_7$ and the address for the third function is stored in the third section of the function register selector and comparator 135.

A print flag is transmitted to the chip 104, namely an $A_6$ flag during $D_6$ time.

Thereafter, the calculator, during $D_5$ time sends the contents of the calculator display register to chip 104 by way of the I/O bus 120 to store four-bit codes representing the digits to be printed in the data register 121. During calculator time $D_4$, the $A_6$ flag is reset.

If a minus mantissa function is to be printed, the $A_8$ flag is transmitted to chip 104 during $D_6$ time. If printing is to be carried out using double space, then the $A_7$ flag is transmitted to chip 104 during $D_6$ time. Finally, if the printing is to be done in red ribbon, then the $A_2$ flag is transmitted to chip 104 during $D_6$ time.

With the advent of $D_4$ time, all of the information necessary for the chip 104 to execute printing of the data in data register 121 and the functions in the selector and comparator 135 are then stored in chip 104. Chip 104 then operates, beginning with $D_4$ time to automatically print the data. Printing will be completed during one complete revolution of the drum.

FIG. 4a

Figure 4B:
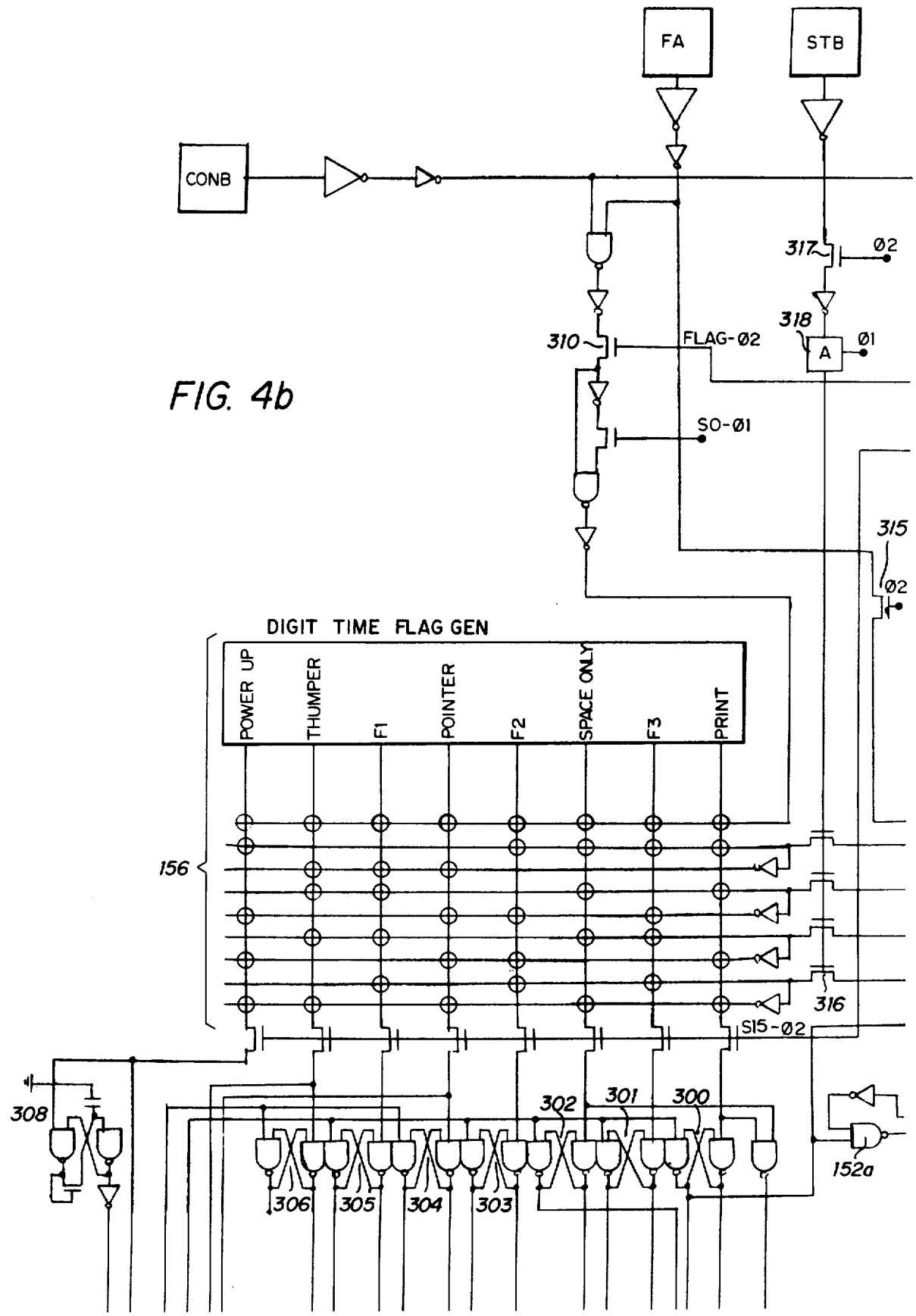
FIG. 4a is an illustration of the relative relation of the matter illustrated in FIGS. 4b–4q FIGS. 4b–4q constitute a composite schematic diagram of the circuit of the printer chip of FIG. 2.
FIG. 4r illustrates the structure of units A of FIGS. 4b–4q.
FIG. 4s illustrates the structure of units B of FIGS. 4b–4q.
Figure 4C:
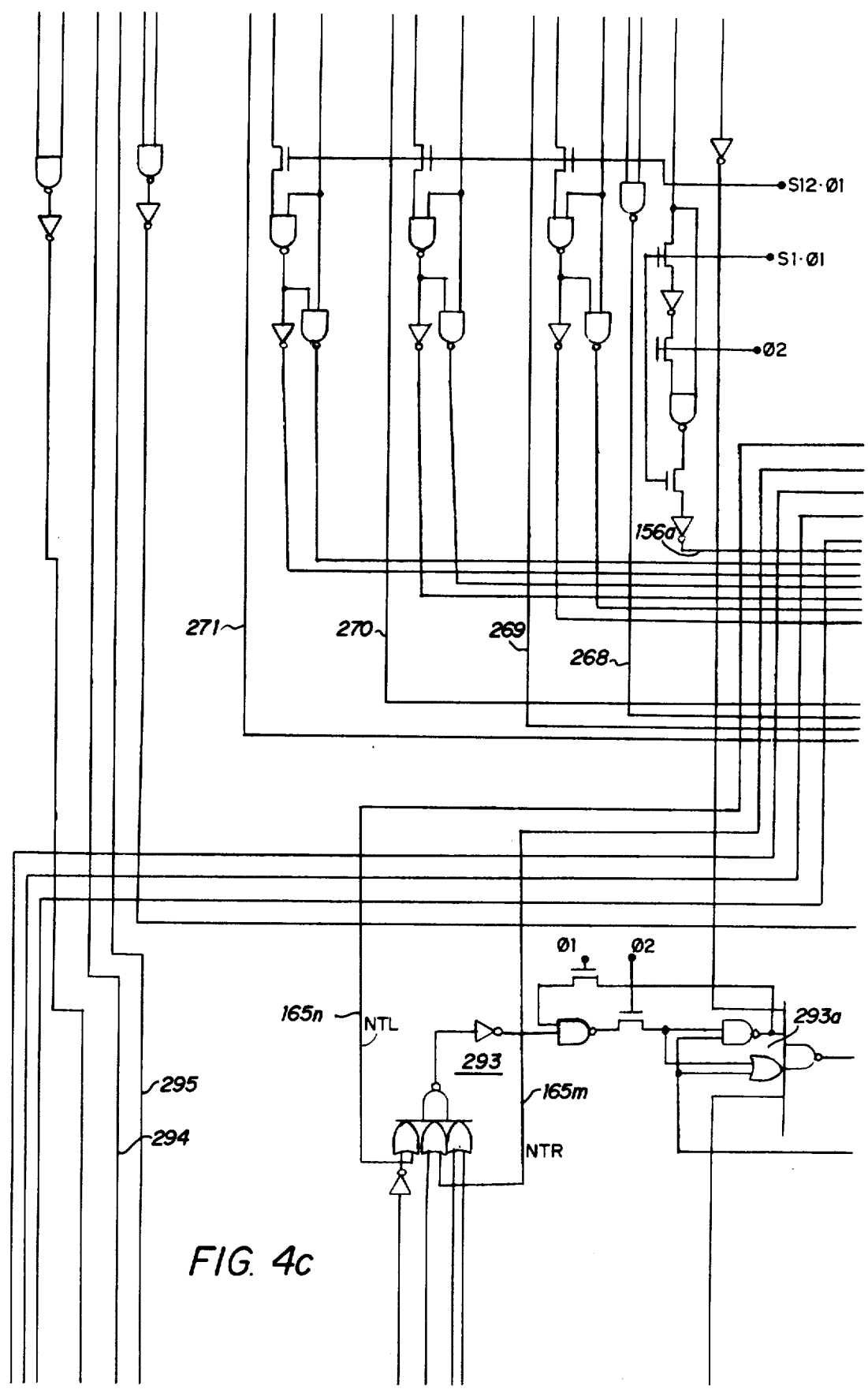
Figure 4D:
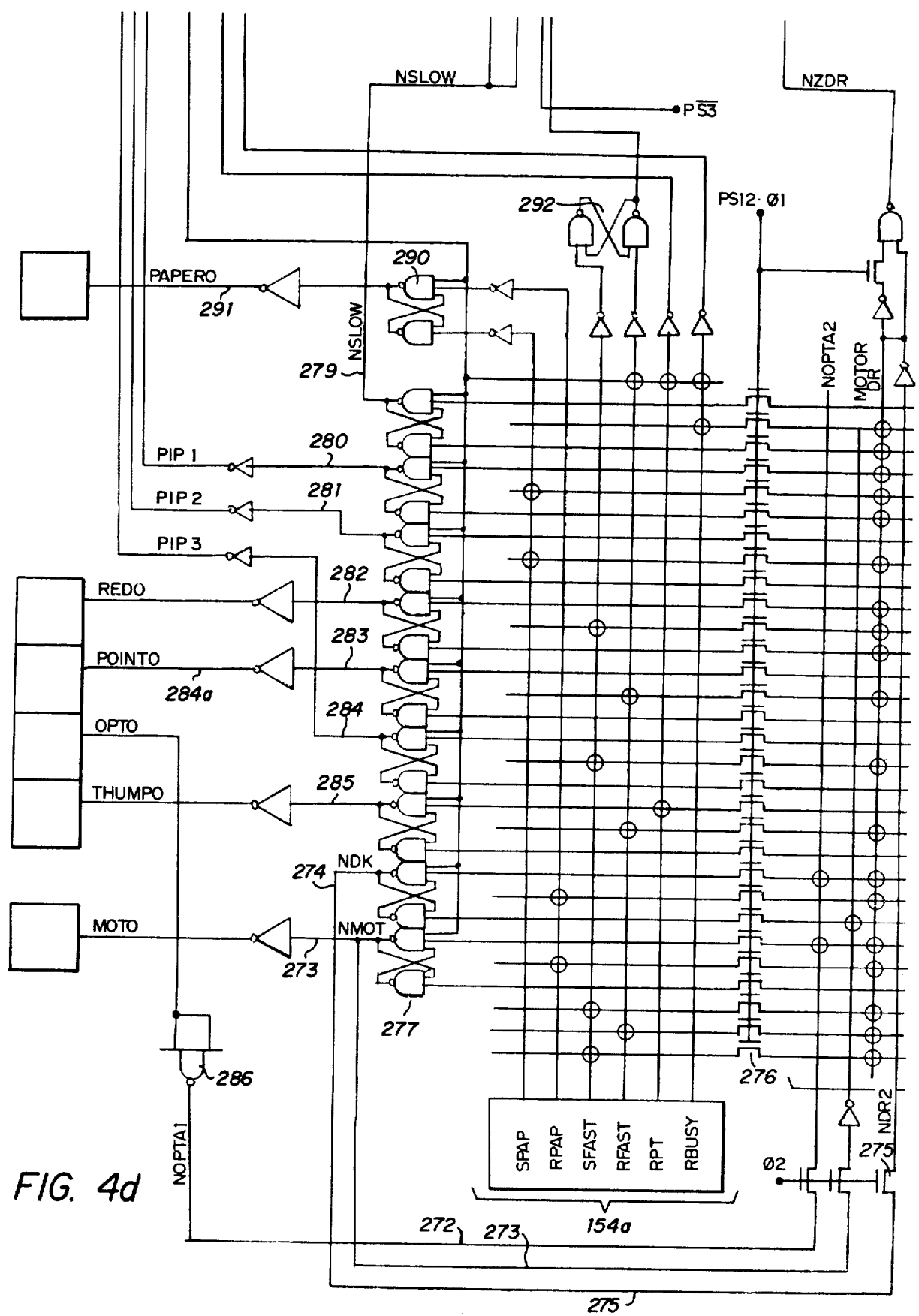
Figure 4E:
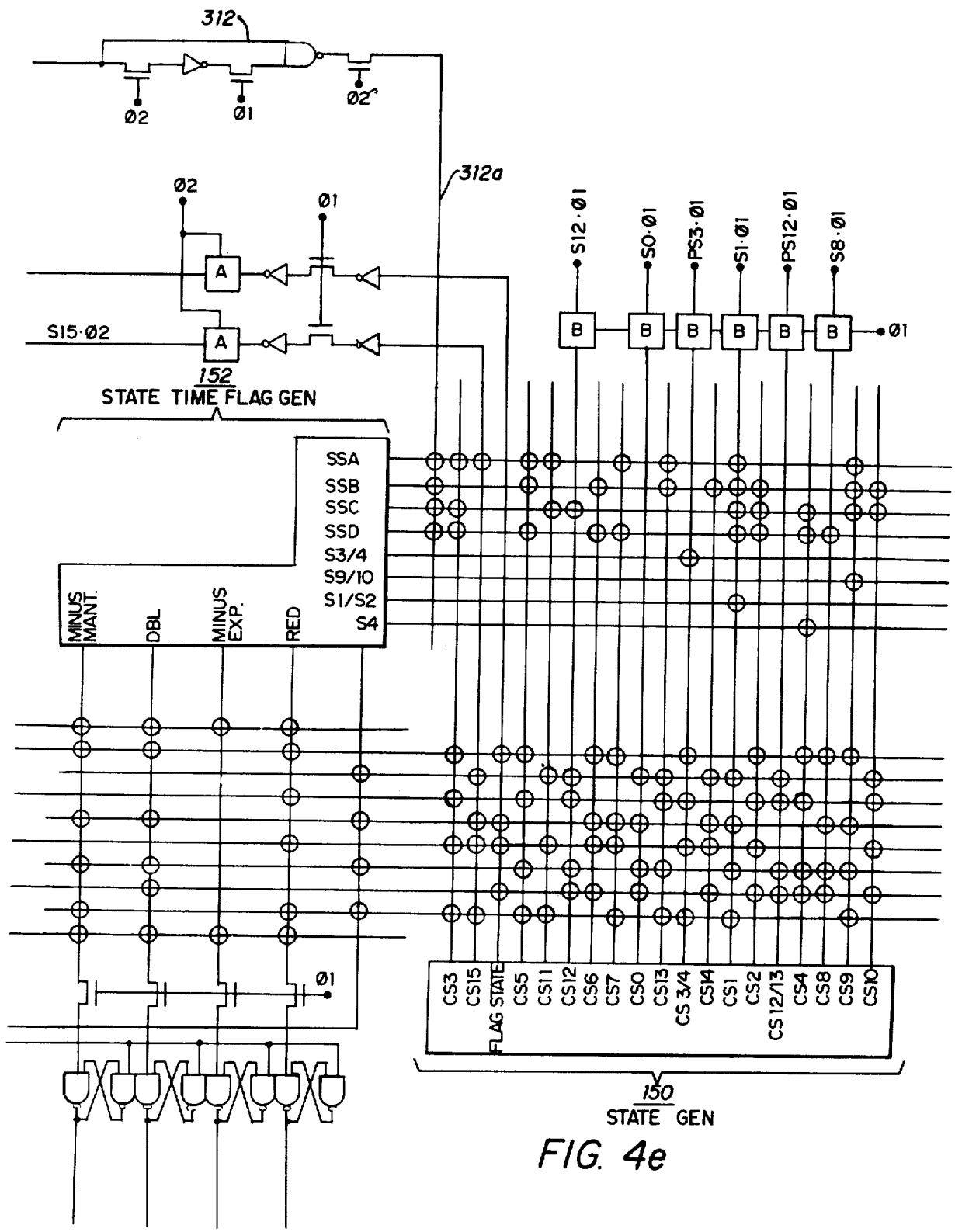
Figure 4F:
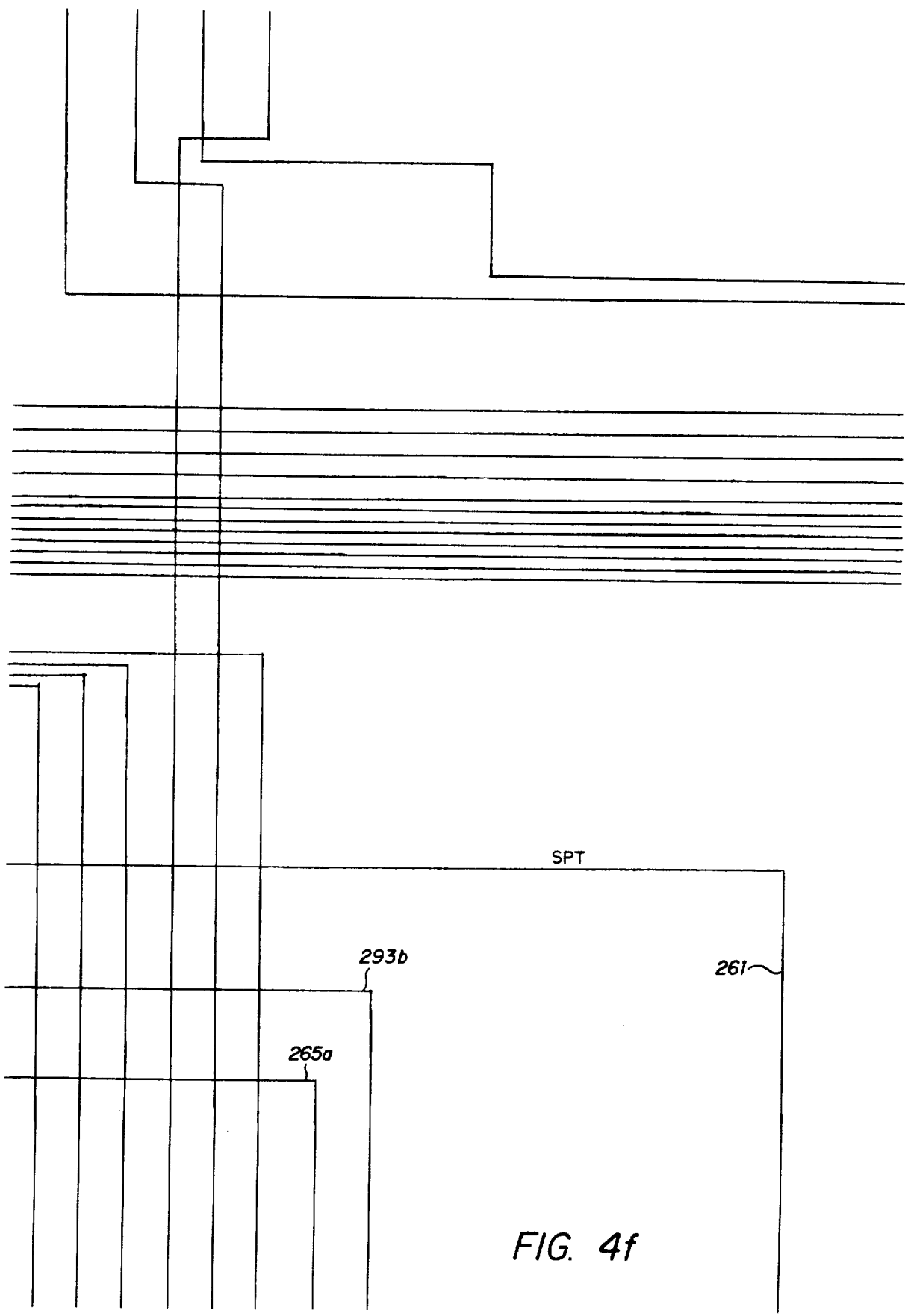
Figure 4G:
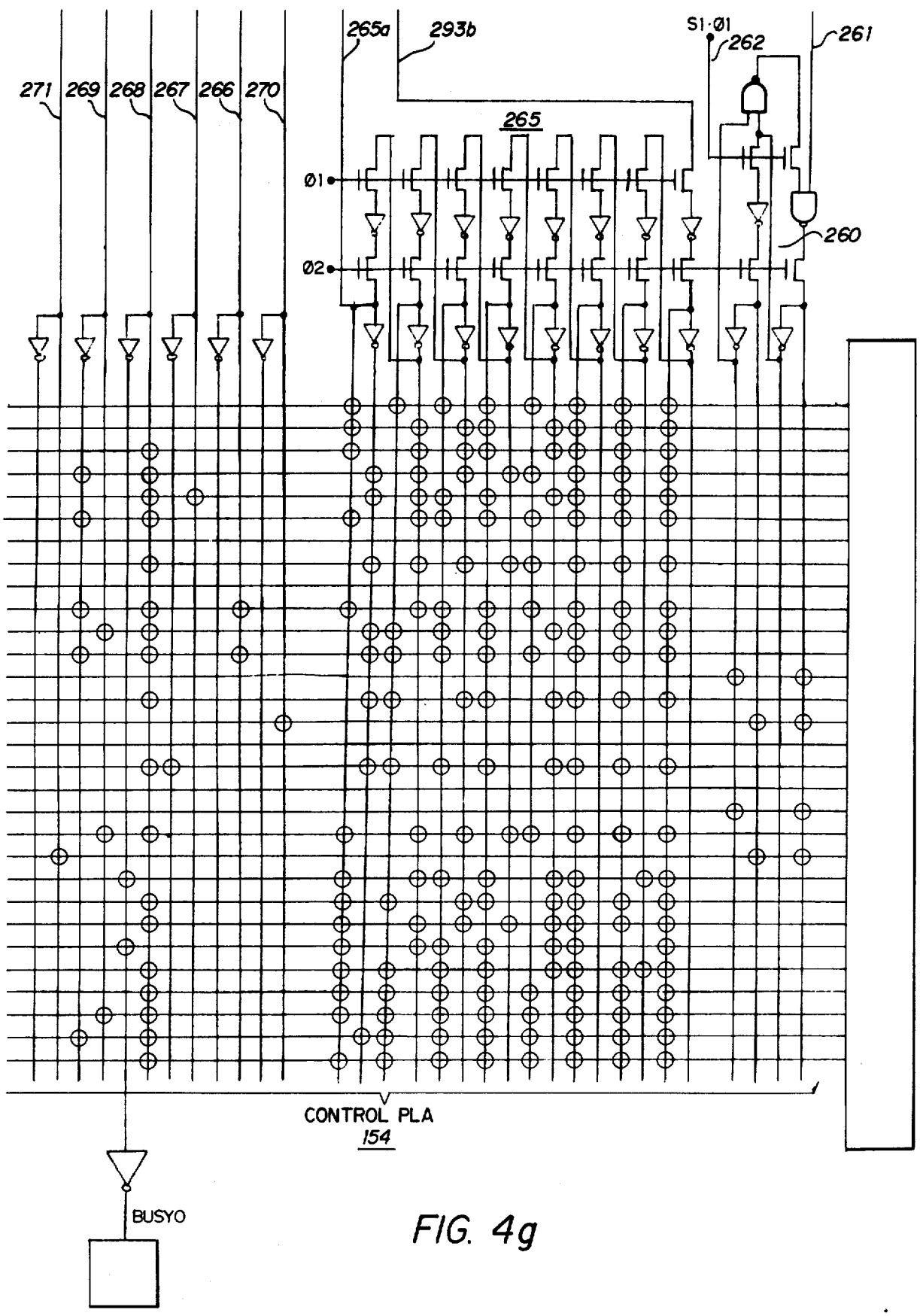
Figure 4H:
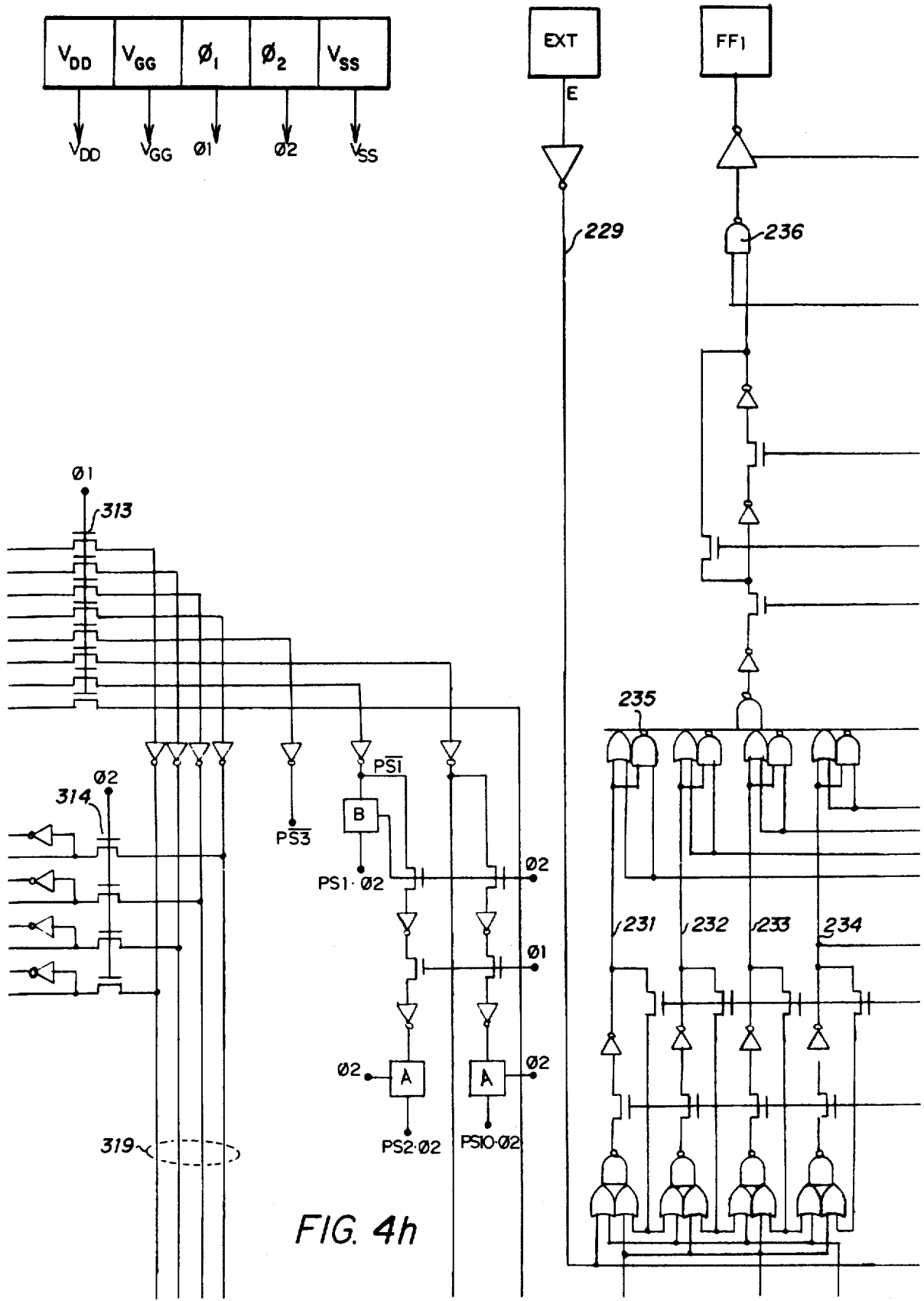
Figure 4I:
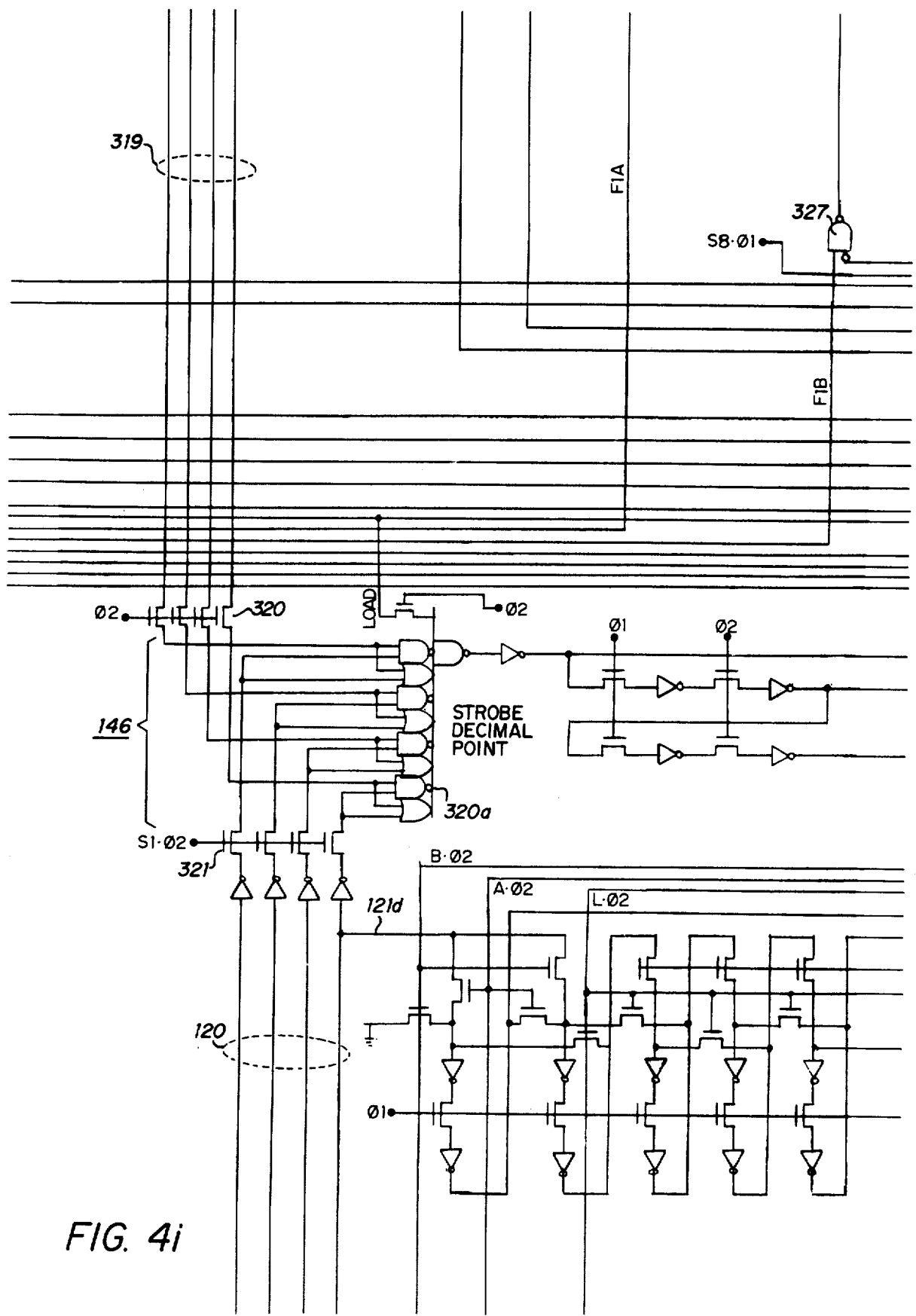
Figure 4J:
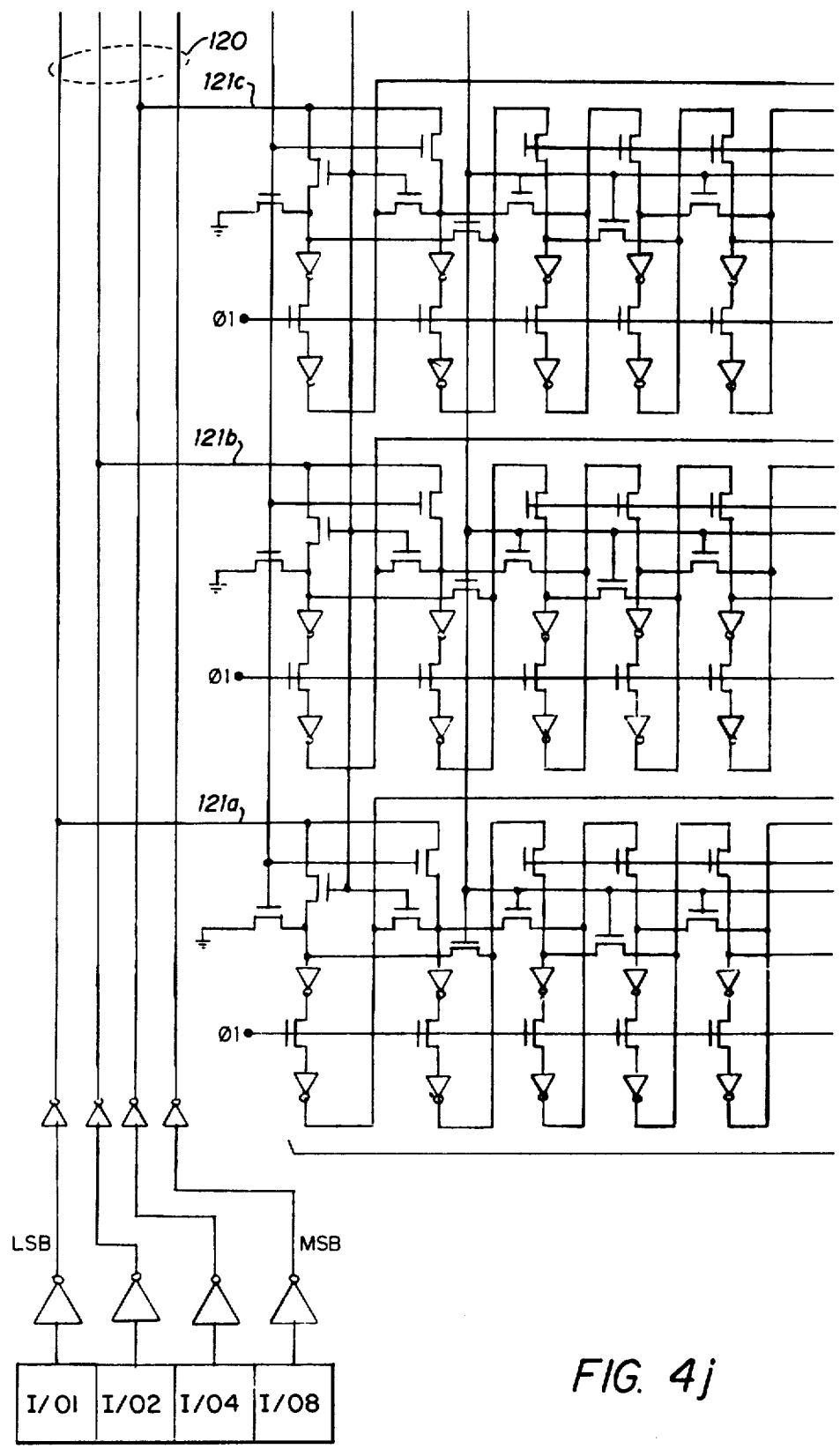
Figure 4K:
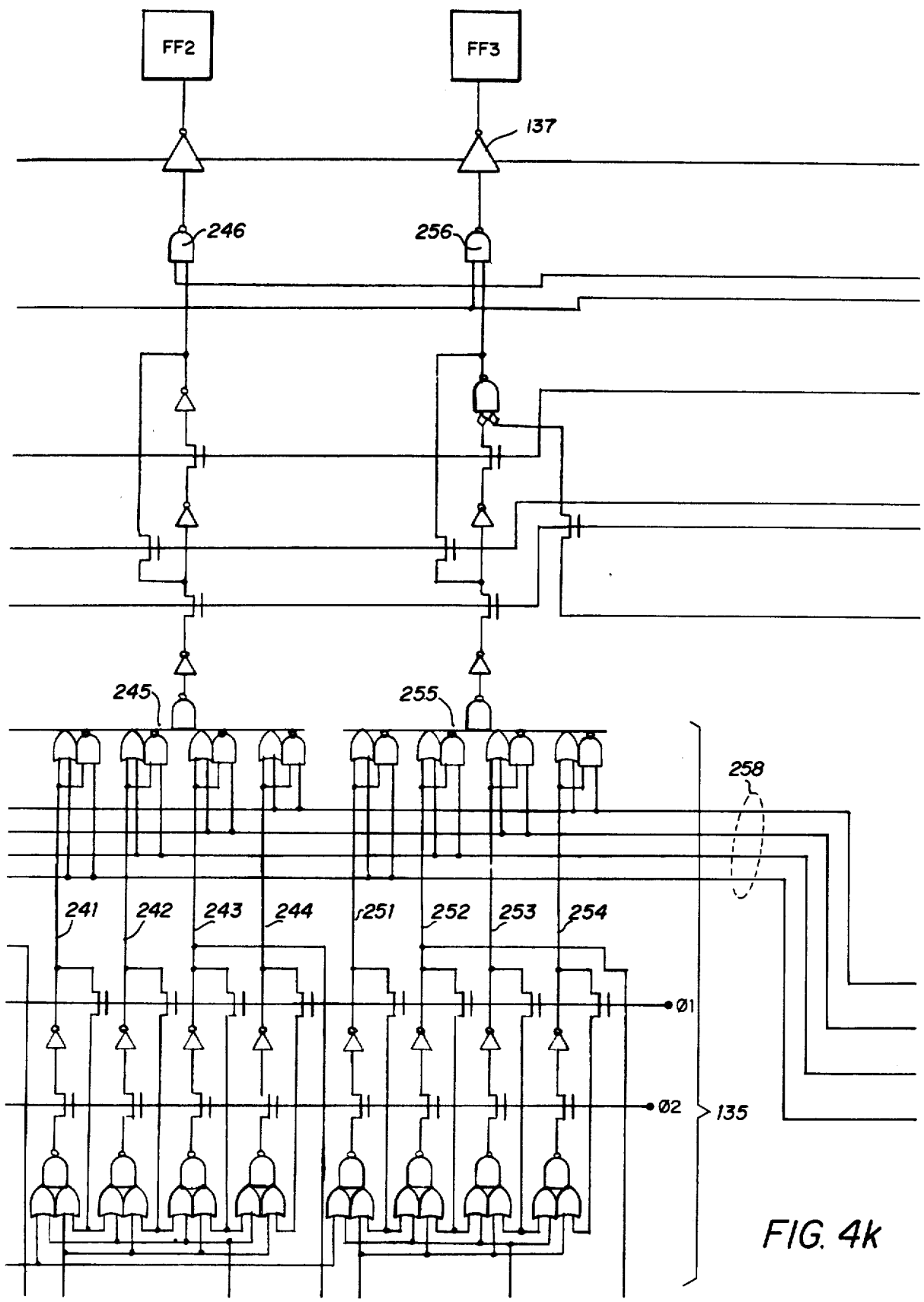
Figure 4L:
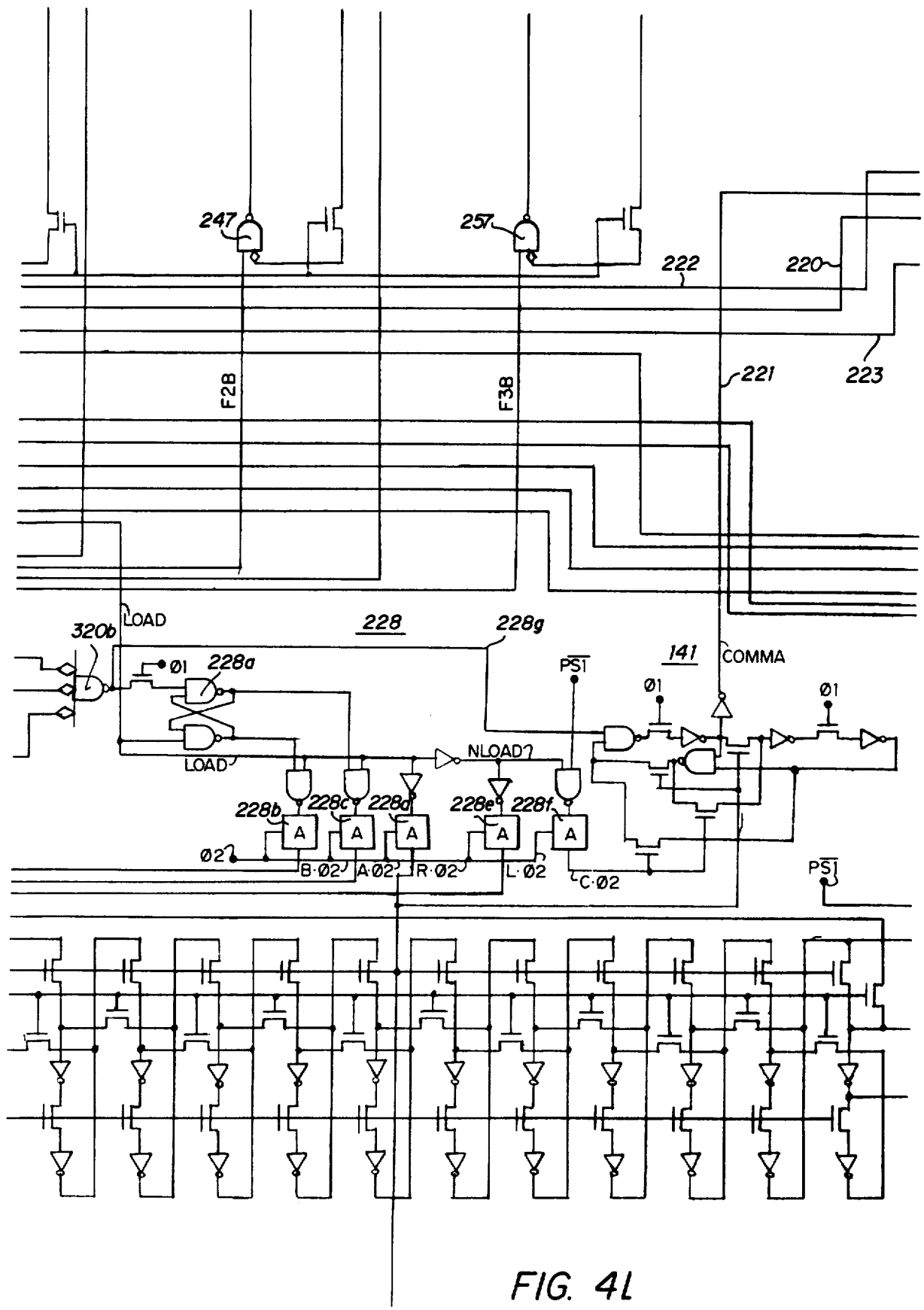
Figure 4M:
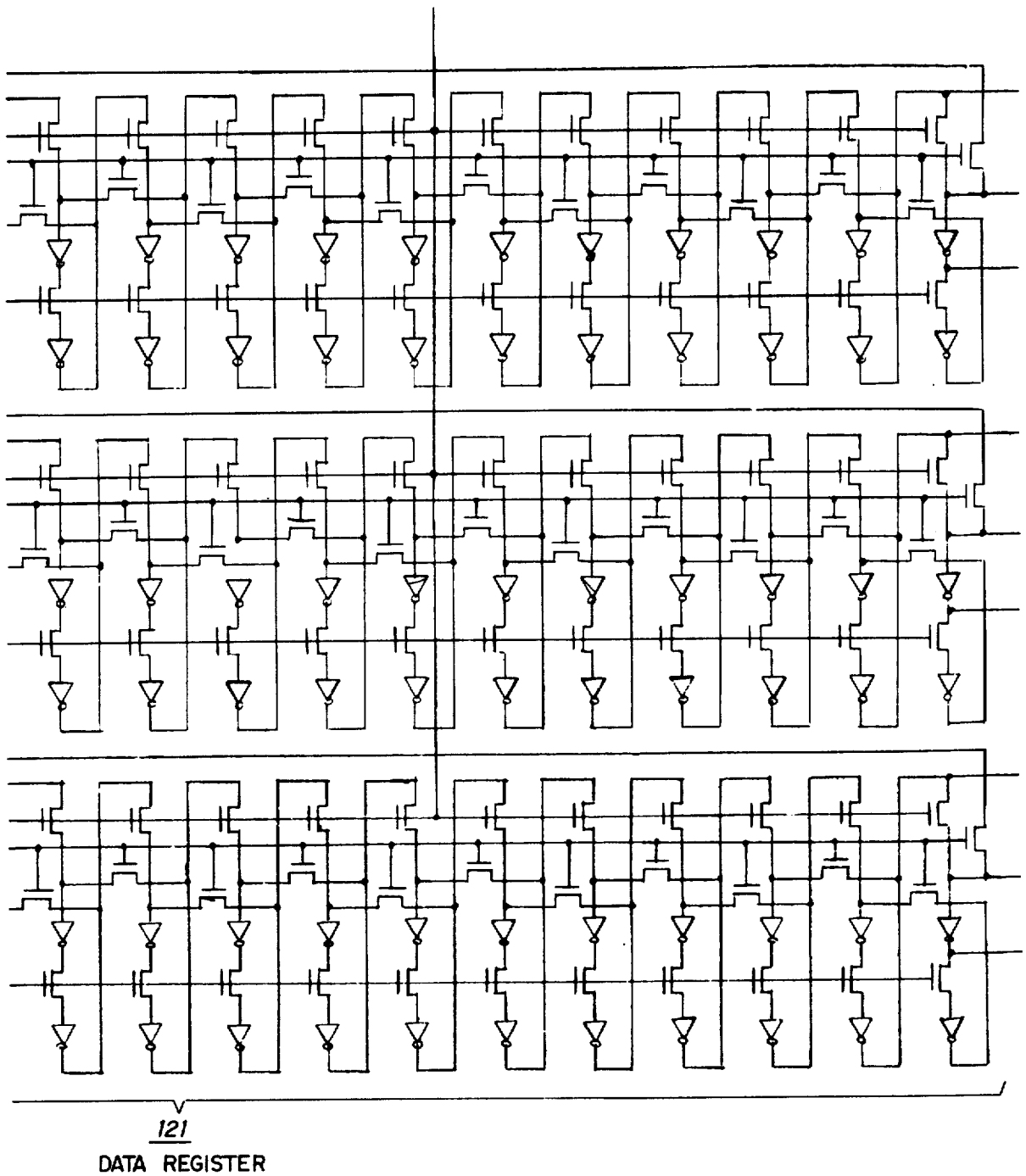
Figure 4N:
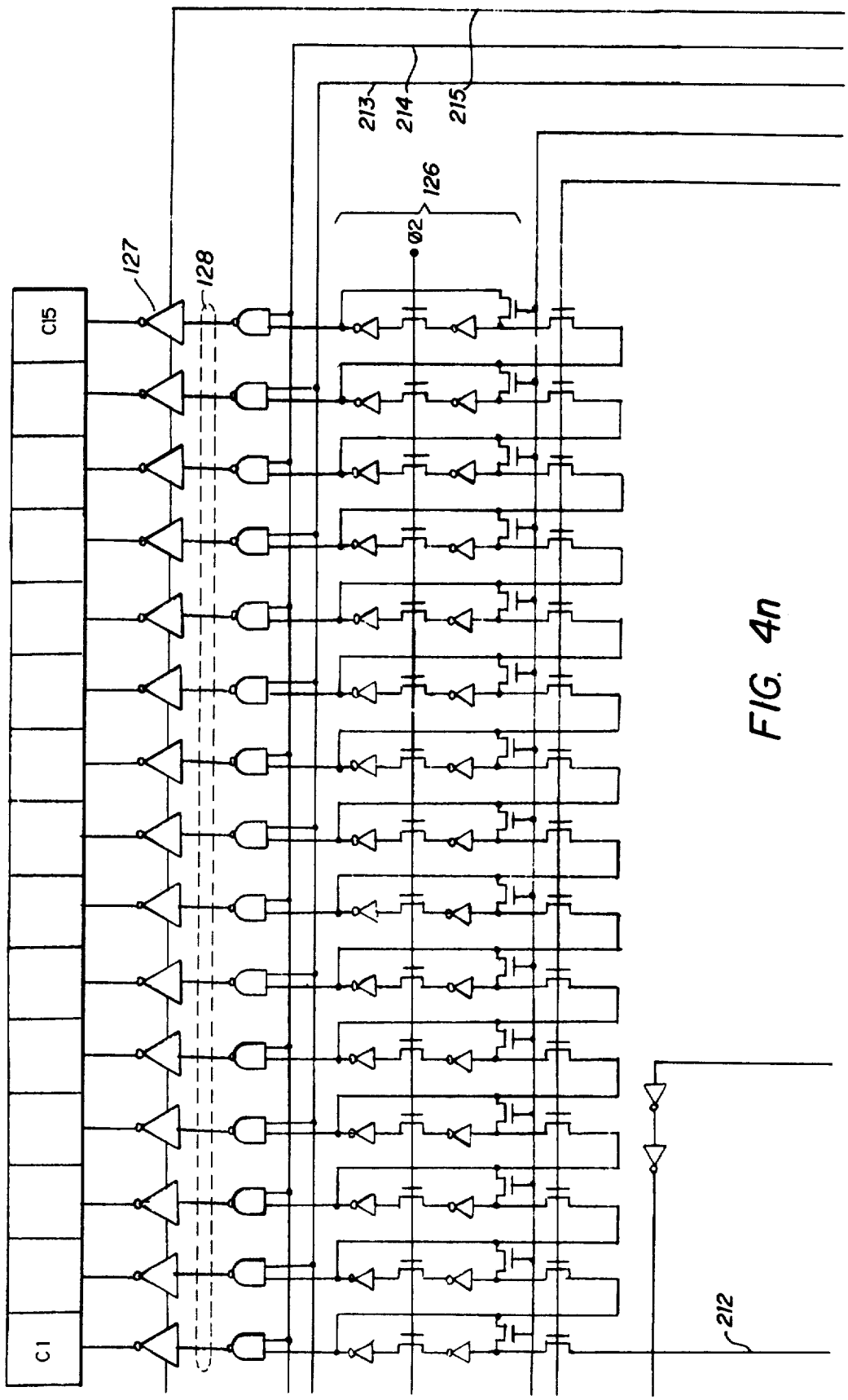
Figure 40:
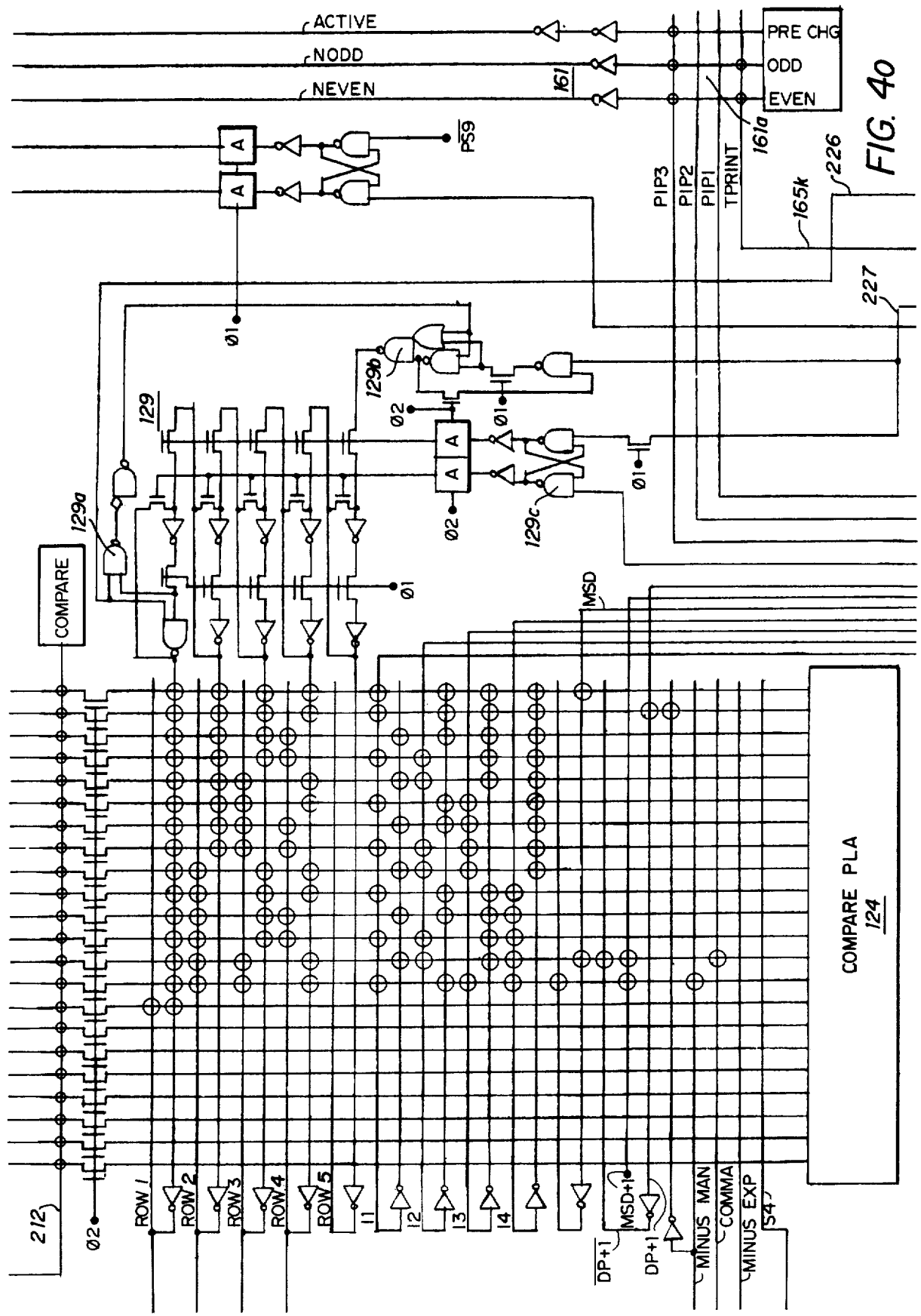
Figure 4P:
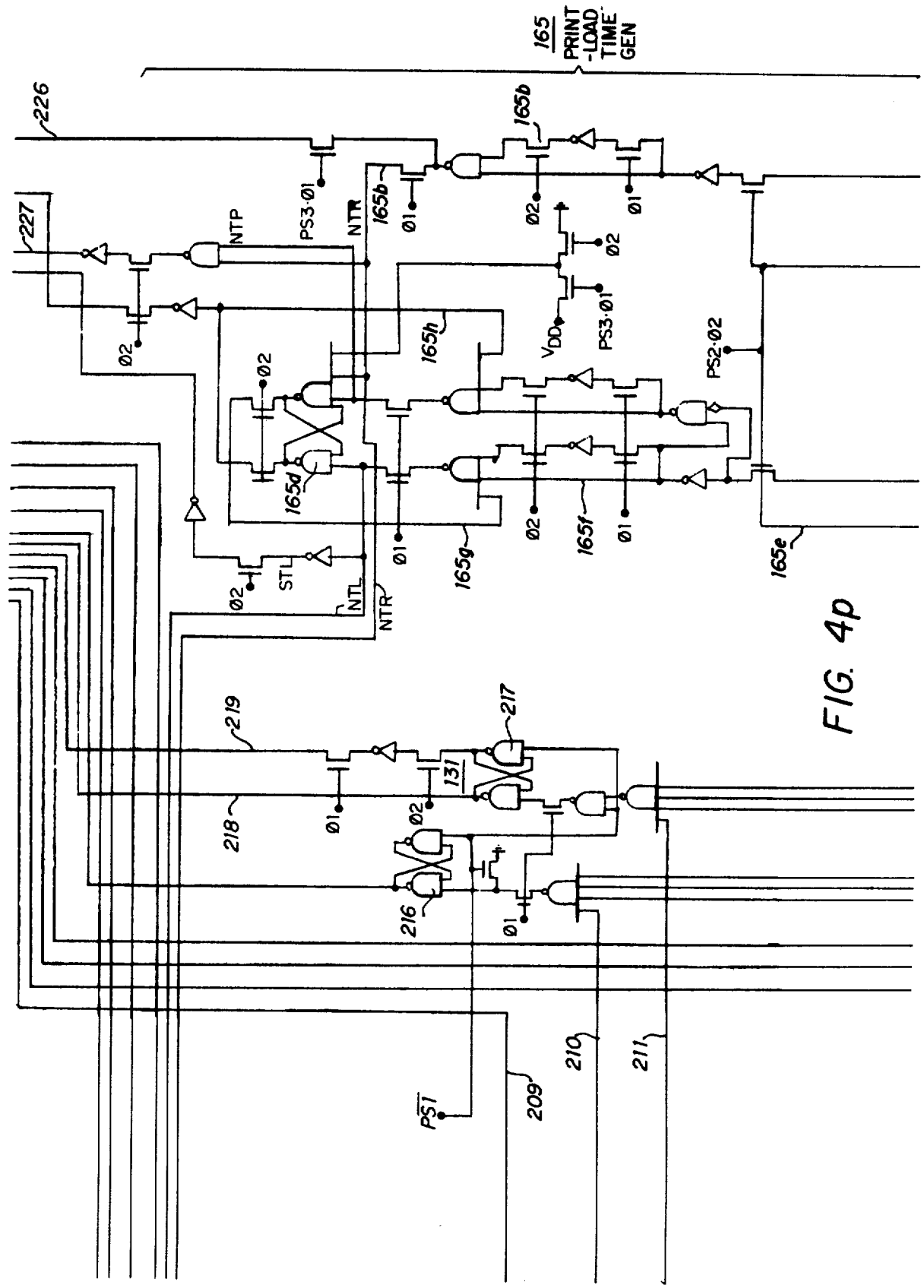

Note that FIG. 4h illustrates pins labeled $V_{DD}$, $V_{GG}$, $\phi_1$, $\phi_2$ and $V_{ss}$. As illustrated schematically, these quantities are applied to printer chip 104 via these pins and hence distributed to various locations of the circuit illustrated in FIGS. 4b to 4q. The exact routing of these signals is not illustrated to avoid showing these conventional connections and to improve the clarity of illustration of the remaining circuits.

FIG. 4a illustrates the relationship of FIGS. 4b–4q. The latter figures comprise a composite schematic drawing of the circuits contained on printer chip 104.

FIGS. 4b–4q

In FIG. 4, the input pins I/O1, I/O2, I/O4 and I/O8 are connected to shift register 121 by way of the four bit bus 120. Binary coded data enters shift register 121 by way of lines 121a–121d. The shift register is a four section sixteen element circulating shift register. The first section has three output lines 200, 201 and 202. The second section has output lines 203–295. The third section has output lines 206–208. The last section has output lines 209–211.

Output lines 200, 203, 206 and 209 are connected to input lines 11, 12, 13 and 14 of PLA 124. The lines 11–14 comprise four input lines of twenty-eight PLA input lines. Twenty-two select lines of PLA 124 are connected by way of a $\phi_2$ gate to an output channel 212 which is the input line leading to shift register 126. The output of shift register 126 is clocked through hammer drivers 127 by way of gates 128 by control states on lines 213–215. The outputs of drivers 127 lead to the fifteen output pins C1–C15 which are connected through the interface circuit 106, FIG. 2, to the drum printer 108, FIG. 1. Thus, fifteen words, representing the symbols to be printed in the first fifteen columns of the drum printer enter the data shift-requests 121 and are clocked into PLA 124 one symbol per state time while circulating in data shift register 121 for selective control of the PLA 124.

Lines 210, 207, 204 and 201 serve as inputs to a decimal point circuit 146, the output of which is a latch 216 which leads to one input line of the PLA 124.

Lines 211, 208, 205 and 202 are connected to logic for detecting the most significant non-zero symbol. The output of this circuit is by way of a latch 217. A first latch output line 218 is connected to the PLA as is a second output on line 219 on which the signal is delayed by one state time through $\phi_2$ and $\phi_1$ gates, respectively, at the output of latch 217. This circuit forms the zero suppression unit 131.

Additional inputs to the PLA 124 provide for selecting:

A minus mantissa by input line 222;
A comma by way of line 221;
A minus exponent by way of line 220; and
An S4 (state four) signal on line 223.

Five additional inputs are provided to PLA 124 from the drum row counter 129. As many as thirty-one drum rows can be accommodated by counter 129. Counter 129 is responsive to the TR and TP-TL signals which are supplied by way of lines 224 and 225, respectively, from the drum. Lines 224 and 225 are connected to input logic 165 which is a print-load time generator. The output of generator 165 appears on line 226 as an input to counter 129. Additional outputs appear on line 227 to increment counter 129 one count for each state time during which data is to be loaded into register 126.

Input data lines 120 lead to a decimal point positions generator 146 which is connected by way of line 320b to the comma control circuit 141.

Seven bit serial function codes enter printer chip 104 by way of pin EXT. The line 229 leads from pin EXT to three inputs to the symbol selector and comparator 135. The first section of unit 135 is connected by way of four output lines 231–234 to a first drum position comparator 235. The output of the first comparator is connected by way of gating to the symbol function driver 137 by way of gate 236. The output line 234 is connected in a recirculate path involving gate 327.

The second section of unit 135 is connected by way of output lines 241-244 to a drum position comparator unit 245. The output thereof is then connected to the hammer driver 137 by way of gate 246. The third output line 243 is connected in a feedback path by way of a gate 247.

The third section of unit 135 has output lines 251-254 connected to a third drum position comparator unit 255. The output of unit 255 is connected by way of gate 256 to pin $FF_5$. The pins FF1, FF2 and FF3 are provided with suitable outputs from gates 236, 246 and 256 which are dependent upon drum position. More particularly, four output lines 258 lead from the PLA 124 and are connected to the selectors 235, 245 and 255.

The operation of the system thus far described is under the control of the output signal logic control PLA 154 which serves to make the chip 104 compatible with the printer connected to the output pins FF1-FF3 and C1-C15. PLA 154 comprises a matrix of thirty-six input lines and thirty output lines. The input lines comprise four functional groups. A first group (four lines) is associated with a two bit shift register 260 having the signal SPT on line 261 gated in by the control $S_1.\phi_1$ on line 262.

A second set (sixteen lines) is controlled by the outputs and complements of an eight bit counter 265.

A third section (twelve lines) is energized by two outputs from the state flag time generator 152, appearing on lines 266 and 267 and four output lines 268-271 leading from the digit time flag generator 156.

The last section (four lines) responds to signals on two output lines from the PLA 154, namely lines 273 and 274 and an input OPTO on line 272 which are applied by way of a $\phi_2$ gate 275.

The thirty select lines of PLA 154 are gated to an output PLA section 154a by way of a gate 276. The outputs of gates 276 are connected as inputs to a set of latches 277 and serve as input lines to the second PLA section 154a. There are eight sections in latch 277 controlling eight output lines. Lines 280, 281 and 283 provide output control signals to the three input lines of a PLA 161a, the outputs of which appear on lines 213-215 to control the hammers in the drum printer. Line 282 is connected to the RED ribbon pin. Line 283 is connected to a POINTER pin to drive a pointer which moves along the printhead. Line 285 is connected to a THUMPER pin to actuate a thumper on the calculator case to audibly signal action having taken place.

It will be noted that the OPTO pin is connected through a programmable NAND gate 286 and thence by way of line 272 to gate 275.

The section 154a of the PLA 154 has six select lines. The first two lines lead by way of a latch 290 and a line 291 to the paper advance pin. The next two select lines lead by way of a latch 292 to control logic 293 for the add one counter 265. The fifth and sixth lines 294 and 295 lead to output latches leading from the digit time flag generator 156. Eight output latches lead from the select lines of the PLA in generator 156, namely latches 300-308. Line 294 is connected into latches 306 and 304. Line 295 is connected into latches 305, 303, 302, 301 and 300.

All control operations are initiated upon the appearance of a CONB pulse at the CON B pin. The CON B pin is connected by way of a first edge detector 310 to the first of nine input lines in the PLA of generator 156. CONB is also connected by way of a second edge detector 312 to the first input line of a PLA in state generator 150. The appearance of CONB in PLA of generator 150 initiates the generation of the sixteen states which follow thereafter. The upper half of the PLA in generator 150 is connected by way of $\phi_1$ gates 313 and $\phi_2$ gates 314 to the lower section of the PLA 150. Eight input lines lead to the lower section of PLA 150. There are nineteen select lines, sixteen of which are programmed. The eight select lines from the lower half of the PLA 150 are in common with the input lines to PLA 152. PLA 152 has a ninth line which is supplied from the Flag A pin by way of a $\phi_2$ gate 315. A tenth input line leads from the output of the latch 300 in PLA 156.

Four input lines of PLA 150 are connected by way of a gate 316 to eight input lines in the PLA 156. The gate 316 is actuated in response to the strobe pulse on the strobe pin which is transmitted by way of a $\phi_2$ gate 317 and a circuit 318 which is supplied with a $\phi_1$ input.

The outputs of gate 313 leading from PLA 150 are connected by way of bus 319 and $\phi_2$ gate 320 to decimal point circuit 146. Input data from lines 120 is fed into circuit 146 by way of $S_1.\phi_2$ gate 321.

Synchronizing inputs from the printer enter chip by way of pins TR and TPTL. Some printers generate two row counter pulses, one at the beginning of each row and one at the end of each row. Such pulses appear at terminal TPTL. Also printers generate one pulse per drum revolution, which is used as a reset pulse. This appears at terminal TR.

Circuit 165a connected to line 224 is a pulse shaper. Circuit 165b is an edge detector so that there is produced on line 226 a reset pulse which is one D time long. This signal is applied to NAND gate 129a and thence to a serial-add-one circuit 129b at the input of counter 129.

The signal on line 165c is one state time long. It is applied to reset a latch 165d and, by way of line 227, to a latch 129c which drives clocks which shift the counter 129.

The TPTL signal on line 225 is applied to a pulse shaper 165e and thence to an edge detector section 165f. A latch 165d has feedback lines 165g and 165h. Edge detector 165e is applied to both inputs of the latch 165d. However, it changes state after reset in response to TPTL pulse. The output of latch 165d has an output line 165k leading to PLA 161a. When line 165k is one then PLA 161a is enabled so that the print operation can be accomplished if the other inputs to the PLA 161a are of the proper state. The other three inputs to PLA 161a are PIP1, PIP2 and PIP3. They are generated by the output signal logic unit 154a.

The output of the edge detectors 165b and 165f are applied by way of lines 165m and 165n, respectively, to inputs of logic circuit 293. Logic 293 drives a serial-add-one unit 293a. Pulses on line 165m along with a state time S3 are used to increment add-one unit 293a. The particular set of pulses that will be employed in unit 293a depends upon the output signals from latch 292 and from the latch feeding line 279.

The output from unit 293a is applied by way of line 293b to the input of counter 265. Unit 293a adds one count each time a one state appears at the output of the logic 293. The output of unit 293a is applied by way of line 293b to the input of a shift register 265 which, by reason of the feedback line 265a and the logic in 293a, causes unit 265 to operate as a counter.

Normally counter 265 is operated at the rate determined by TPTL pulses appearing on line 165n. However, it may be desired to count rapidly through the sequence of counter 265. In such case the line P53 can be energized to increase the state rate. In contrast it may be desired to count longer periods such as when the system is inactive and after a predetermined time interval to turn off power to the system to conserve power. In such case, the signal on line 165m would be employed so that the counting rate would be much lower, i.e., at one counter per drum revolution.

The count rate should be apparent by reason of the fact that the gate 276 is actuated once each instruction cycle. As long as no new pulse enters the counter 265 by way of logic 293, the shift register 265 will not change state each time that the signal $\phi 1.512$ actuates gate 276. All symbols stored in register 121 are printed during a single revolution if both PIP1 and PIP2 are enabled at the same time. In such case lines 280 and 281 would be coded identically by section 154a.

Odd columns of symbols may be printed on one drum revolution and the even columns of symbols on the succeeding drum revolution. In that case, the lines 280 and 281 would be enabled alternately, one on a first drum cycle and the other on the next drum cycle.

Only one of the PIP lines 280, 281 and 284 would have to be programmed if all symbols are to be printed on one drum revolution. The three lines are provided for flexibility in selecting the print operation.

Operation of State Generator 150

When CONB appears, the edge thereof is detected in circuit 312 and the input line 312a to PLA 150 is energized. This initiates operation of the generator 150. The state generator 150 then continues to operate so long as the clocks $\phi 1$ and $\phi 2$ are applied thereto. The output lines 319 of generator 150 will then be coded BCD to cycle through states 0 through 15.

The code on lines 319 is then applied through gate 320 to a comparator 320a which compares two four bit words. One four bit word is on lines 319. This is a binary representation of the state the system is in at any given time. The other four bit word is on bus 120 and is gated at $S1\phi 2$ through gates 321. The binary value of the output of gates 321 is the decimal point position. That is, the four bit word appearing on bus 120 at time S1 is the decimal point position word. The outputs of gates 321 are clocked into the input of comparator 320a for one instruction cycle. However, the code on lines 319 is clocked in at $\phi 2$ and thus is present only for one state time. Thus, decimal point codes are applied to a gate 320b which is indicated to be programmable. This is because the code on lines 120 may indicate the decimal location: (1) at its actual location; (2) at one location displaced; or (3) two locations displaced. If it is at the actual location then only the upper contact on gate 320 will be programmed. If it is one location displaced then only the center input will be programmed. If it is displaced two places then only the lower input will be programmed.

The output of gate 320b leads to a latch 228a in a control circuit 228. Latch 228a is operated to control the insertion of a word representation of the decimal point into the register 121. More particularly, the load line 156a normally is at a zero state and goes to a one state during a load instruction cycle as programmed in PLA 156. Since the load line 156a is at a zero state, then the logic units 228b, 228c and 228d are disabled and the logic units 228e and 228f are enabled. When unit 228e and 228f are enabled the shift register 121 operates in circulating mode shifting from right to left, i.e., in a left shift mode under the control of the output of unit 228e. When the load line 156a goes high then units 228b, 228c and 228d are enabled and 228e and 228f are disabled. The output of unit 228d causes register 121 to shift data from left to right, i.e., in a right shift mode. This mode is effective during the time numerical data words on line 120 are entered into the second element of the four sections of register 121. At the same time, a one state is loaded into the first element of each of the sections of the register. Thus, a decimal point is indicated by a 1111 word, which is an invalid BCD code word. However, when a decimal code appears at the output of gate 320b, and is recognized the latch 228a is flipped so that the ones in the first elements of each section of the register 121 are clocked into the second elements of each section of register 121 in response to the output of logic unit 228c. At the same time, the next four bit word is loaded into respective first elements of each of the sections of shift register 121. The output of latch 228a controls unit 228b and 228c whereas unit 228d has a single control leading from the load line 165a. After the decimal point word is entered during a given state time, the output of unit 228d continues to shift data from left to right until the entire register 121 is loaded. As the decimal point word in the first element of the sections of shift registers 121 is shifted right, an additional numerical data word from bus 120 enters into the first element of each section this continues until register 121 is fully loaded. The fully loaded register 121 has a decimal point word of all ones loaded in the propert position for the decimal point. Line 165a goes back to zero and as units 228b, 228c and 228d are turned off and units 228e and 228f are turned on. This then causes the data in register 121 to circulate at a rate of one step in each state time.

It will be noted that register 121 is loaded with the least significant bit first. In the circulating mode the most significant bit is read out on lines 200-211 first.

Unit 228 serves to clock a bidirectional ring counter which is used to energize output line 221 to thereby insert a comma at the correct location in a string of figures to be printed. Commas segregate the printout symbols located to the left of the decimal point into groups of three digits.

Line 228g and the output from unit 228f both extend to circuit 141 which provides control for printing commas. The output of circuit 141 appears on line 221 and extends to the PLA 124.

Circuit 141 serves to print commas on each third digit ahead of the decimal point. PLA 124 is programmed to suppress commas ahead of the most significant digit.

More particularly line 228g leads to the comma control circuit 141 along with the outputs from unit 228d and 228f. The position of the decimal in a given instruction cycle is established by applying a state to circuit 141 over line 228g. The output from unit 228b then shifts data entered on line 228g to circuit 141 which is a three stage bidirectional ring counter. As long as gate 228d is operating, the single state entered into circuit 141 shifts the same direction as the data in shift register 121. When gate 228b is disabled gate 228f is enabled to shift the data in register 141 in the opposite direction. This maintains the same comma location relative to the data in the register 121. An PSI state is applied to the gate input to unit 288f. Thus, once each instruction cycle the unit 141 pauses so that it counts on 15 of the 16 clocks in an instruction cycle. This means that each time a one state appears on line 221 a comma will be enabled.

However, the PLA 124 is programmed on the line $\overline{DP+1}$ and on line MSD so that commas will not be printed ahead of the most significant digit or after the decimal point.

State Time Flag Generator 152

Digit Time Flag Generator 156

The state time flag generator 152 has four output latches. Each of the flags is set when flag a occurs on a program state. The select line SO in PLA 150 is connected by way of gate 152a to reset any of the latches that have been set during the preceding instruction cycle. Presetting of the four latches at the output of PLA 152 does not take place if a print command has been given. The print command, when detected, sets latch 300 so that the output thereof leading to gate 152a changes from its normal state of one to zero so that the output of gate 152a is a one which causes the latches to remain in their fixed state. The latches will then remain in that condition until latch 300 is reset. It is reset only when line 295 goes to zero. This occurs when the print cycle has been completed. The digit time flag generator 156 provides control for the function register 135.

Function Print 135

EXT line provides for flow from the calculator of two eight bit strings per instruction cycle. The eight bit strings contain in three of the last four bits a designation as to which of the columns is to be printed. The eight bit string contains in the first four bits a code identifying the row to be printed. Thus, in the unit 135 during one instruction cycle the first eight bits is applied by line 229 to each of the three shift registers. The first three bits of the second four bits in the first set of eight bits are loaded into each of the three registers. It will be noted that the first bit is fed back through gate 327 in the first register. The second bit is fed back through gate 247 in the second register. The third bit is fed back through gate 257. The three outputs are gated to the units 327, 247 and 257 through S8ɸ1 gates. If the output of any of the gates 327, 247 or 257 is then in a zero state this permits the first four bits of the second train of eight bits during that instruction cycle to be loaded into shift register. The second four bits is the code for the row to be printed. This code is then effective through logic 235, 245 and 255, in comparison with the row code on lines 258 to enable the printing of selected words. After the first four bits of the second train of eight bits per instruction cycle has entered registers of unit 135 then the lines F1B, F2B and F3B go to zero disabling gates 327, 247 and 257. At the same time lines F1A, F2A and F3A go to zero which allows the data in the shift registers to circulate bit by bit.

General Overview

In summary, digit time and state time are generated internally and use the $\overline{STB}$, and CONB signal to synchronize them with calculator system. A power-up operation is required to send a positive edge of CONB to synchronize the printer chip.

Any kind of printing operation is decoded from the flag information at state and/or D-time.

Each operation is begun by sending the printer flag which is programmable, such as Flag A6. The particular D-time that this flag appears on determines the operation. These D-times are fully programmable.

Available operations are:

1. A power up operation which clears all printer control outputs and also clears control PLA latches, and doesn't clear the buffer register.

2. Thumper & Pointer operations cause a level one on the appropriate output. The duration of these pulses can be programmed to be one, two or three D-time in length. After a printer control flag is sent, the pulse begins on S12 of the following D-time and lasts until S12 of the appropriate later D-time number. The duration of the thumper and the pointer don't have to be the same.

3. Advance paper operations cause a level one on the paper output, the duration of this pulse is controlled by programming the control PLA 156. It can last for a fixed number of D-time (S3), of TL, or of TR signals. This signal will always begin and end at S12.

4. Before a print operation can be executed the functions or symbols must be defined if requested.

There are several ways to program the chip at this point. A specific D-time is chosen for each function; D11 for F1, D9 for F2, D7 for F3. The printer row is selected with the four least significant bits of the register transmitted to the printer chip via the EXT outputs of the Data chip. When the printer flag is set the function identification must appear at the EXT at the following D-time. After a print is completed, the above functions are automatically cleared.

The printing operation starts when the printer flag is set during a particular D-time, programmed for this purpose, during this D-time, four other flags could be set to give more information about the printing operation.

These flags set latches, two latches go to the control PLA 154, and the two others go to ROW/data compare matrix 124. The two latches that go to the control PLA 154 are labeled Red Ribbon & Double space respectively. The remaining two are—mantissa and—EXP (not used) and go to the ROW/data compare matrix 124.

In the control PLA 154 and ANDing part has 30 terms and 36 possible inputs. 16 inputs are taken up by eight bit binary counter 265, which is used to order the events. Four lines are from a 2 bit ring counter 260, which is used to control the length of the thumper and pointer signals. Lines C, D and their complements come from the flag state time PLA 152 and line A, B, E, & F from the flag D-time PLA 156. Two of the remaining four come from DR complement & latch and motor complement. The remaining one can be either a latch output or an external input on pin 35, 36.

The ORing part 154a has 6 terms, four of these lines are used to set and reset two latches. And the remaining are used to reset the latches in the flag D-time PLA.

If a space or print operation flag is set the clear operation is initiated. It is initiated also when the control PLA 154 output latch referred to as DR goes to a one. The clear operation takes 16 state-times.

Three counting modes are available, in general the external outputs are expected to change every character pulse. This is the normal counting mode. The two other modes are for special purposes; one of them is to count long periods of time (seconds, up to 1 minute) and to count the TR signal. The remaining counting mode is to skip over parts of the normal sequence between character pulses such as paper advance.

Having described the invention in connection with a specific embodiment thereof, it is to be understood that further modifications may now suggest themselves to those skilled in the art and it is intended to cover such modifications as fall within the scope of the appended claims.

What is claimed is:

1. In a printer control system for controlling the printing of a set of numerals and a decimal point in response to a sequence of multibit data words including a decimal point position word indicating the position of a decimal point followed by a plurality of numeral words indicating respective numerals of the set of numerals, the combination comprising:
   (a) an input means for receiving the sequence of data words;
   (b) a first clock pulse generating means for generating a first series of clock pulses at a first predetermined rate;
   (c) a shift register connected to said first clock pulse generator having a plurality of sections equal in number to the number of bits in the multibit data words, each section including a predetermined number of sequentially connected elements, said predetermined number being at least as great as the number of data words in the sequence of data words, said shift register for storing data words in a set of corresponding elements in each of said plurality of sections and for shifting said stored data words along said sequence of elements at said first predetermined rate of said first series clock pulses; and
   (d) a logic gate means, connected to said input means and said shift register, for entering numeral words received by said input means into said shift register one at a time in the order in which they are received and for entering a data word indicative of a decimal point into said shift register in a position within the sequence of numeral words indicated by the decimal point position word.

2. The combination of claim 1, wherein:
said logic gate means includes first means for entering numeral words received before the position within the sequence of numeral words indicated by the decimal point position word into a first set of corresponding elements of each of said plurality of sections of said shift register and a second means for entering numeral words received after the position within the sequence of numeral words indicated by the decimal point position word into a second set of corresponding elements of each of said plurality of sections.

3. The combination of claim 2, wherein:
within each section of said shift register the element of said first set of corresponding elements is adjacent to the element of said second set of corresponding elements.

4. The combination of claim 1, further comprising:
   (a) a second clock pulse generating means connected to said first clock pulse generating means and to said logic gate means for generating a second series of clock pulses having a second predetermined rate which is a predetermined integral fraction of said first predetermined rate, said generation of said second series of clock pulses taking place after said logic gate means enters said data word indicative of a decimal point into said shift register means; and
   (b) an output means connected to said shift register and said first and second clock pulse generating means for controlling in conjunction with said first series of clock pulses the characters printed by a printer in accordance with the data words shifted in said shift register and for further controlling in conjunction with said second series of clock pulses the printer to print a special character each time said predetermined integer number of characters in accordance with data words are printed.

5. The combination of claim 4, wherein:
said second clock pulse generating means comprises a three stage ring counter receiving said first series of clock pulses from said first clock pulse generating means for generating a clock pulse of said second series of clock pulses each time three of said clock pulses of said first series of clock pulses is received.

6. In a printer control system for controlling the printing of a set of numerals, a decimal point and commas in response to a sequence of multibit data words including numeral data words and a data word indicative of a decimal point, the sequence of multibit data words being entered into a shift register one data word at a time in a timed relationship for storage in the shift register and the sequence of multibit data words being outputted from the shift register one data word at a time in a time relationship, the combination comprising:
   (a) a counter;
   (b) a means connected to said counter and the shift register for enabling said counter after the data word indicative of a decimal point is entered into the shift register;
   (c) a means connected to said counter and the shift register for incrementing said counter upon entry of each data word in the sequence of data words into the shift register;
   (d) comma word insertion means connected to said counter and receiving the sequence of data words outputted from the shift register for controlling the characters printed by a printer according to the sequence of data words and for inserting a data word indicative of a comma into the sequence of data words for controlling the printing of a comma each time the counter counts three.

7. The combination of claim 6, wherein said counter comprises a stage ring counter.

8. The combination of claim 7, wherein said combination further comprises means connected to said counter and the shift register to reset said counter in response to the entry of a new sequence of multibit data words into the shift register.

9. The combination of claim 7, wherein said combination further comprises means connected to said comma word insertion means to inhibit insertion of a comma after the last nonzero numeral word in the sequence of data words following the data word indication of a decimal point has been outputted from the shift register.

* * * * *